(12) United States Patent
Fink et al.

(10) Patent No.: US 11,093,809 B2
(45) Date of Patent: Aug. 17, 2021

(54) MACHINE-READABLE TAPE

(71) Applicant: Advanced Functional Fabrics of America, Cambridge, MA (US)

(72) Inventors: Yoel Fink, Brookline, MA (US); Nicholas Dimitruk, Belmont, MA (US); Federico Bescotti, Boston, MA (US); Catherine Chapman, Spartanburg, SC (US)

(73) Assignee: Advanced Functional Fabrics of America, Cambridge, MA (US)

( * ) Notice: Subject to any disclaimer, the term of this patent is extended or adjusted under 35 U.S.C. 154(b) by 0 days.

(21) Appl. No.: 16/985,854

(22) Filed: Aug. 5, 2020

(65) Prior Publication Data
US 2021/0042595 A1    Feb. 11, 2021

Related U.S. Application Data

(60) Provisional application No. 62/883,061, filed on Aug. 5, 2019, provisional application No. 62/895,111, filed on Sep. 3, 2019.

(51) Int. Cl.
*G06K 19/06* (2006.01)
*G09F 3/10* (2006.01)

(52) U.S. Cl.
CPC . *G06K 19/06093* (2013.01); *G06K 19/06037* (2013.01); *G09F 3/10* (2013.01)

(58) Field of Classification Search
CPC ........ G06K 19/00; G06K 19/04; G06K 19/06; G06K 19/06046
USPC ................................ 235/494, 487, 454, 375
See application file for complete search history.

(56) References Cited

U.S. PATENT DOCUMENTS

| | | | |
|---|---|---|---|
| 4,397,142 A | 8/1983 | Bingham |
| 4,766,301 A | 8/1988 | Evers |
| 5,592,561 A | 1/1997 | Moore |
| 5,726,435 A | 3/1998 | Hara et al. |
| 5,854,148 A | 12/1998 | Asada et al. |
| 6,141,441 A | 10/2000 | Cass et al. |
| 6,296,022 B1 | 10/2001 | Lowe |

(Continued)

FOREIGN PATENT DOCUMENTS

| | | |
|---|---|---|
| CN | 202351910 U | 7/2012 |
| EP | 0919650 A1 | 6/1999 |

(Continued)

OTHER PUBLICATIONS

"Announcing Popcode 0.8" URL =<http://web.archive.org/web/20100903145835/http://www.popcode.info/>.

(Continued)

*Primary Examiner* — Edwyn Labaze
(74) *Attorney, Agent, or Firm* — Nutter McClennen & Fish LLP

(57) ABSTRACT

Exemplary embodiments use a single, physical embodiment that compiles independent machine-readable codes together with little to no space in between codes. This physical embodiment is in two primary forms—adhesive tape or fabric strips with hook and loop backing. A code reader device, with software compatible with the machine-readable codes, can rapidly or simultaneously aggregate independent codes together on the physical embodiment in order to assign them to one or more digital addresses.

30 Claims, 36 Drawing Sheets

(56) References Cited

U.S. PATENT DOCUMENTS

| | | | |
|---|---|---|---|
| 6,301,044 B1 | 10/2001 | Huber et al. | |
| 6,315,202 B2 | 11/2001 | Costin et al. | |
| 6,641,053 B1 | 11/2003 | Breidenbach et al. | |
| 6,647,130 B2 | 11/2003 | Rhoads | |
| 6,656,319 B1* | 12/2003 | Boyd | C09J 5/02 |
| | | | 156/305 |
| 7,032,823 B2 | 4/2006 | Nojiri | |
| 7,066,644 B2 | 6/2006 | Padgett | |
| 7,194,327 B2 | 3/2007 | Lam | |
| 7,195,165 B2 | 3/2007 | Kesler et al. | |
| 7,310,885 B2 | 12/2007 | Tedesco et al. | |
| 7,409,769 B2 | 8/2008 | Tedesco et al. | |
| 7,802,313 B2 | 9/2010 | Czajka | |
| 8,094,870 B2 | 1/2012 | Crookham et al. | |
| 8,229,799 B2 | 7/2012 | Singhal | |
| 8,261,972 B2 | 9/2012 | Ziegler | |
| 8,945,328 B2 | 2/2015 | Longinotti-Buitoni et al. | |
| 9,390,358 B1 | 7/2016 | Cheung | |
| 9,416,468 B2 | 8/2016 | Bassi | |
| 9,562,998 B2 | 2/2017 | Edmonds et al. | |
| 9,607,199 B2 | 3/2017 | Stein | |
| 10,607,052 B2 | 3/2020 | Broselow | |
| 2003/0106985 A1* | 6/2003 | Fagin | G06K 9/2054 |
| | | | 250/208.1 |
| 2004/0115430 A1 | 6/2004 | Leonard | |
| 2004/0157686 A1 | 8/2004 | Sauer | |
| 2006/0169783 A1 | 8/2006 | Gagne | |
| 2006/0249582 A1* | 11/2006 | Golabek, Jr. | B65C 9/44 |
| | | | 235/462.01 |
| 2007/0033697 A1 | 2/2007 | Soldwedel | |
| 2010/0192433 A1 | 8/2010 | Lewis | |
| 2010/0319712 A1 | 12/2010 | Czajka | |
| 2011/0073655 A1 | 3/2011 | Simske et al. | |
| 2012/0085829 A1 | 4/2012 | Ziegler | |
| 2012/0146784 A1 | 6/2012 | Hines et al. | |
| 2012/0212789 A1* | 8/2012 | Shirakura | G09F 3/0291 |
| | | | 359/2 |
| 2013/0037609 A1 | 2/2013 | Merritt-Munson et al. | |
| 2013/0117909 A1 | 5/2013 | Paas | |
| 2013/0254966 A1 | 10/2013 | Pattison | |
| 2014/0103123 A1 | 4/2014 | McKinney, Jr. | |
| 2014/0203085 A1 | 7/2014 | Park | |
| 2014/0358806 A1 | 12/2014 | DiVincenzo et al. | |
| 2015/0010725 A1* | 1/2015 | Vogt | G09F 3/0286 |
| | | | 428/43 |
| 2015/0106290 A1 | 4/2015 | Stevenson | |
| 2015/0145671 A1 | 5/2015 | Cohen et al. | |
| 2015/0186965 A1 | 7/2015 | Paul | |
| 2015/0231481 A1 | 8/2015 | Jones et al. | |
| 2016/0128156 A1 | 5/2016 | Segers | |
| 2017/0037546 A1 | 2/2017 | Lau et al. | |
| 2017/0233904 A1 | 8/2017 | Weening et al. | |
| 2017/0283662 A1* | 10/2017 | Nelson | C09D 11/00 |
| 2019/0213369 A1* | 7/2019 | Ackley | G06K 7/10851 |
| 2019/0325279 A1 | 10/2019 | Wang et al. | |

FOREIGN PATENT DOCUMENTS

| | | | |
|---|---|---|---|
| EP | 1158452 A2 | 11/2001 | |
| EP | 2163286 A2 | 3/2010 | |
| JP | 2006249638 A | 9/2006 | |
| JP | 2012087523 A | 5/2012 | |
| WO | 1997026619 A1 | 7/1997 | |
| WO | 200048139 A1 | 8/2000 | |
| WO | 2014098130 A1 | 6/2014 | |
| WO | 2014126654 A1 | 8/2014 | |
| WO | 2016108221 A1 | 7/2016 | |
| WO | 2017008435 A1 | 1/2017 | |
| WO | 2017042628 A1 | 3/2017 | |
| WO | 2018/129051 A1 | 7/2018 | |
| WO | 2019/240867 A1 | 12/2019 | |

OTHER PUBLICATIONS

"LED Buttons" URL=<https://www.aliexpress.com/item/758118749.html>.

"LED Illuminated Pushbutton—30 mm Round" URL=<https://www.adafruit.com/product/492>.

"QR Code Version 1 to 10" (QR Code) 2010 (2010); retrieved from the internet Feb. 21, 2018; entire document, especially Table.

"Reed-Solomon Error-correcting Codes The Deep Hole Problem" (KETI) Nov. 8, 2012 (Nov. 8, 2012); retrieved from the internet Feb. 21, 2018; URL=<https://www.math.uci.edu/~mketi/research/advancementsummary.pdf>; especially 1 Introduction to Error-correcting Codes paragraph 1 p. 2, and QR Codes p. 7.

"Smartphone Augmented Reality Marker by Augment" (AUGMENT) Jul. 27, 2016 (Jul. 27, 2016); retrieved from the Internet Feb. 21, 2018; URL=<https://www.youtube.com/watch?v=uavpTPciYb0>; entire video, especially ~0:09-0:30.

"Zappar—Augmented Virtual & Mixed Reality Solutions" URL=<www.zappar.com>.

Bruzzese, Cosimo. "Emma Marrone & QR Tribe—Internet Promo," Vimeo, Viemo Inc., 2001, https://vimeo.com/20891404.

Horn, Leslie. "Those Who Wear a QR Code T-Shirt Deserve Nothing Ridicule," Gizmodo, Gizmodo Media Group, Jun. 25, 2012, http://gizmodo.com/5921094/those-who-wear-a-qr-code-t-shirt-deserve-nothing-but-ridicule.

International Search Report and Written Opinion for Application No. PCT/US18/12193 dated May 2, 2018 (19 pages).

International Search Report and Written Opinion for Application No. PCT/US2019/026549 dated Aug. 2, 2019 (10 pages).

Kinney, Chance. "Wear Your Heart on Your Sleeve With QRTribe Apparel," ChipChick, Chip Chick Media, Jun. 25, 2012, http://www.chipchick.com/2012/06/qrtribe-apparel.html?utm_source=rss&utm_medium=rss&utm_campaign=qrtribe-apparel.

Kooser, Amanda. "Scan My Bosom with ScanMe's QR Code T-shirts". URL=<https://www.cnet.com/news/scan-my-bosom-with-scanmes-qr-code-t-shirts/>.

Larson, Julie. "Dynamic QR Codes: Reuse The Same QR Code" URL=<https://www.searchenginepeople.com/blog/dynamic-qr-codes.html>.

Tine "Black and White Stickers" URL=<https://shop.tinetag.com/products/tine-tags-100-pack?variant=10614640580>.

Wikipedia "Scan (company)". URL=<https://en.m.wikipedia.org/wiki/Scan_(organisation)>.

Wikipedia "Shotcode". URL=<https://en.m.wikipedia.org/wiki/ShotCode>.

Wikipedia "Steganography" URL=<https://en.wikipedia.org/wiki/Steganography>.

Wikipedia "Visible Light Communication" URL=<https://en.wikipedia.org/wiki/Visible_light_communication>.

Chow, Chi-Wai et al. "Visible Light Communication Using Mobile-Phone Camera with Data Rate Higher than Frame Rate". Optical Society of America. vol. 23, No. 20.2015.

Pathak, Parth H. et al. "Visible Light Communication, Networking, and Sensing: A Survey, Potential and Challenges". IEEE Communications Surveys & Tutorials. vol. 7, No. 4. Fourth Quarter 2015.

Zhang, Jialiang et al. "Towards a Visible Light Network Architecture for Continuous Communication and Localization". URL=<https://dl.acm.org/doi/pdf/10.1145/2981548.2981556>.

International Search Report and Written Opinion for International Application No. PCT/US2020/045013, dated Oct. 27, 2020 (12 pages).

* cited by examiner (a)            (b)

(a) (b)

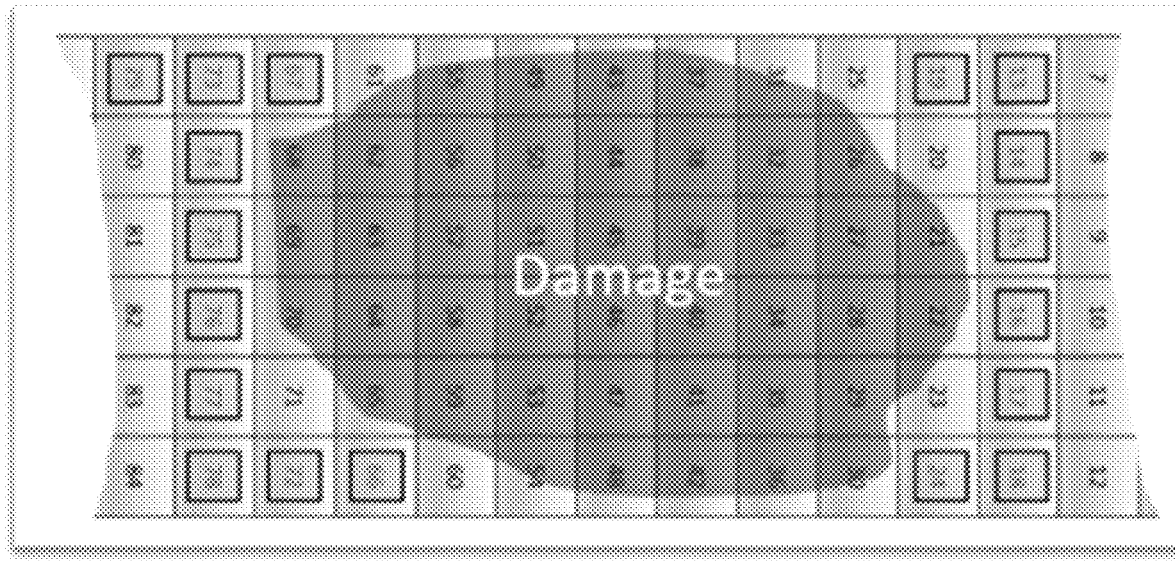
FIG. 22
 
FIG. 23

LOOkable Tape

Description: An adhesive, rolled duct tape with a continuously changing, optical recognition plaid code digitally printed onto the top layer.

Colorways: One, Military Green

Size: O/S (I)

(a)

MACHINE-READABLE TAPE

CROSS-REFERENCE TO RELATED APPLICATION(S)

This patent application claims the benefit of U.S. Provisional Patent Application No. 62/883,061 entitled MACHINE-READABLE TAPE filed Aug. 5, 2019 and also claims the benefit of U.S. Provisional Patent Application No. 62/895,111 entitled MACHINE-READABLE TAPE filed Sep. 3, 2019, each of which is hereby incorporated herein by reference in its entirety.

STATEMENT REGARDING FEDERALLY SPONSORED RESEARCH

This invention was made with U.S. Government support under Agreement No. W15QKN-16-3-0001 awarded by the ACC-NJ. The Government has certain rights in the invention.

FIELD OF THE INVENTION

The invention generally relates to machine readable codes on adhesive tape and machine-readable codes on fabric strips with hook and loop backing.

BACKGROUND OF THE INVENTION

There are many contexts in which an object needs to be tagged with digital information such as for identifying the object and tracking the location of the object. Such tagging is often in the form of a unique, machine-readable code (e.g., bar code, QR code, etc.) that is placed on the object and associated with digital information such that when the code is scanned, the associated digital information can be retrieved, used, and updated. Barcodes and QR codes have proven very useful in industry, most notably in inventory management systems, but also in other contexts For purposes of this patent application, machine readable code is defined as a pattern that can be read and decoded optically by a compatible code reader device such as using a camera system or a light source and sensor mechanism. There are many different types of machine-readable codes, including but not limited to barcodes and Quick Response (QR) codes. These codes can be printed and used on many different types of physical and flexible form factors including paper, plastic, and any other flexible composite. FIG. 3 shows some common examples of how machine-readable codes are used, where FIG. 3(a) shows an example of a machine-readable code used on a paper sticker, FIG. 3(b) shows an example of a machine-readable code printed on carboard, and FIG. 3(c) shows an example of a machine-readable code printed on plastic. Barcode is commonly used to track items that move through the supply chain. QR code is commonly used to provide a rapid short cut to a website. Both machine readable codes can be printed on flexible composite material such as paper, cardboard, plastic and fabrics.

Machine readable code can be used in many different ways, including but not limited to tracking inventory and supply, or providing users rapid access to a webpage. Generally speaking, when machine readable code is used in these examples, the same exact code (i.e., pattern) is used for multiple locations or objects. For instance, with inventory and supply tracking, all items that fall under a specific stock keeping unit (SKU) will use the same code. When using machine readable code for quick access to webpages, the same code is employed to bring users to a single, common webpage.

There are circumstances, however, when users need more access to unique codes—codes that have a distinct pattern that is different from other codes. An example of this circumstance is a user tracking assets or locations that require unique digital content associated with that asset or location. For example, a construction supervisor may have a very specific set of instructions associated with a one particular room. The construction supervisor could use a machine-readable code to link this instruction to the specific room in question. This can often be done using a machine-readable code with an adhesive backing that can attach to a surface in the room. The supervisor links the digital instruction, contained in the cloud or local database, to the machine-readable code (i.e., pattern) on the adhesive sticker. A second construction worker can use a code reader device to scan this code, which then links the device to the specific digital address containing the instruction. In order for this process to work, the construction supervisor needs a unique machine-readable code for that room alone, because otherwise this instruction could get erroneously applied elsewhere if the same repeated code is applied to other rooms.

Another example for needing unique machine-readable codes is tracking personal belongings. A unique machine-readable code may be useful when the information tied to a physical object is distinct to that object. For example, as shown in FIG. 4, a user has containers that might contain different contents, and therefore the user would want to assign and track distinct digital information attached to each respective container. Thus, in this example, each container requires a unique machine-readable code for tracking the contents of these containers. The user can assign a unique digital address to each of the containers using machine readable stickers with their own distinct and readable pattern, where the digital address might be associated with information such as the contents and/or storage location of the container. When machine readable codes are used in this context, the codes often come in packaging that separates the codes into a set of 10 or more stickers, for example, as shown in FIG. 5.

In the context of machine-readable codes that can be used to track assets or locations, such machine readable codes are often sold as flexible composites that can attach to surfaces using adhesives. Examples include, but are not limited to, a rolled liner containing individual and unique machine-readable codes printed on stickers, and packages of individually separated machine-readable codes also printed on stickers. These example form factors are shown in FIG. 5, where FIG. 5(a) shows machine readable codes on adhesive stickers attached to a rolled liner, where a user would have to peel off each sticker, attach it to a respective physical location, and upload digital content. FIG. 5(b) shows machine readable codes on stickers that are physically separated and packaged. Again, a user a user would have to peel off each sticker, attach it to a respective physical location, and upload digital content.

In the examples illustrated in FIG. 5, as well as many others, the use of machine-readable codes in this way has certain limitations. These limitations hinder mass adoption of machine-readable codes used to organize digital content associated with physical objects and locations. Some of these limitations are described in detail below.

Limited scale: These labels often come in rolls or packages that separate each physical label as seen in FIG. 5. For instance, a roll could contain 50 labels separated and attached to a common liner, or a package could contain 10 completely separated labels. In both cases, each unique code is physically separated from one another. This separation is a constraint in two ways. It limits the amount of unique codes a customer can obtain per unit of product due to the magnitude of separation. It also significantly increases the price paid per unique code due to scaling limitations. This is especially the case when unique code comes in packages that separate each adhesive label. For instance, a package of 10 labels can cost $10, so every individual and unique code costs a customer $1 each.

Lack of convenience and physical ruggedness: An added constraint to these adhesive labels in their current physical form is convenience for 'on the fly' and/or rugged use. For instance, an unpackaged rolled liner of individual stickers would likely unfurl inside a tool kit or a pocket, causing the roll to take up more space and the physical integrity of each sticker to be weakened. FIG. 6 demonstrates how a rolled liner can unfurl, causing individual stickers to be subject to damage under non-ideal circumstances such as when housed inside a toolkit. The package of individual stickers such as shown in FIG. 5(b), though maintaining integrity inside the package, would take up too much room to be realistically put in a toolkit or a pocket. When both types of labels are unpackaged for quick access and exposed to rough conditions, such as in a toolkit or a pocket, they can wrinkle, bend or tear unless properly handled with care. This type of damage can make the codes unreadable by a code reader device, and therefore both form factors cannot function reliably as intended when it comes to more rugged conditions. This is one of many reasons why machine-readable labels face adoption resistance in spaces such as front-line construction work.

Constrained to a one to one interaction: A user can only interact with one code at a time. A user cannot successfully scan and interact with multiple codes (i.e., multiple pattern segments) simultaneously using a machine-readable device such as a smartphone or barcode scanner. This is both a physical and a software-based constraint. The physical constraint is because the unique codes are, from the onset, physically separated such that a machine-readable device would have difficulty observing multiple codes simultaneously within the parameters of its scanning area. The software constraint is to because existing code reader devices typically are programmed to search for one code at a time. This means if a user wants to assign the same digital content to multiple machine-readable codes, they must scan one code at a time to do so.

Lack of digital ruggedness and reliability: Key elements of the entire machine-readable code, in its current form, must be observable and in focus by the code reader device in order for it to be successfully scanned. In other words, if key elements of the code are damaged or partially obscured, the user cannot interact with digital content assigned to that machine-readable code, for example, as depicted in FIG. 7. For instance, many QR codes require the finder patterns on the three different corners to be observable and in focus for the QR code to be successfully scanned. FIG. 7(a) is an illustration showing these finder patterns on a standard QR code. If any of these finder patterns are unobservable or damaged, the code reader machine will not be able to scan the code successfully, and the user will not be able to interact with digital content assigned to that specific code. This would also be the case if vertical lines that make up a single barcode are damaged or missing, which in turn makes the barcode unreadable. FIG. 7(b) is a photograph showing undamaged bar and QR codes. Both codes can be successfully scanned by a machine-readable device in this image. FIG. 7(c) shows simulated damage to both codes such that the codes cannot be properly scanned by the machine-readable device. The two obscured areas in FIG. 7(c) render both codes completely unreadable by a device, e.g., a missing finder pattern, in this case the top right corner being covered up, renders the QR code unreadable, while a missing bar code, in this case a rectangle covering the entire '6' part of the barcode, renders it unreadable. This limitation can make many current machine-readable codes on the market unreliable when circumstances prevent a code from being completely observable by a code reader device.

Lack of versatility: Another limitation to machine readable codes currently on the market is the lack of versatility when it comes to creating a code's size or shape in real time. Currently, when a user has a machine-readable label such as a QR or barcode, that label is fixed in one or both of its x-y dimensions. It can only function as intended in its original size. Furthermore, the code cannot be spliced and function as two independent and functional codes. In other words, the user cannot cut through a code physically in real time and, for instance, create several independent codes out of the previous, larger code. Not only is it impossible to create independent codes by breaking the code into smaller pieces, but once broken, the code is completely unusable unless the user physically reunites the pieces together with great care. This lack of flexibility means a user cannot, for instance, rip a piece of QR code or barcode to different shapes or sizes in real-time, something that might be necessary if the code is used in different ways. For example, a user might want a small code to stick onto an individual tool for tracking, but a larger code to track a large container. FIG. 8 schematically shows instances in which a barcode or QR code would be readable and instances when they would not be readable if torn or cut. Neither of these codes can be spliced and still function as intended. In other words, both codes are intended to be used as one complete code only. If either of these codes is torn or split apart, the code no longer functions as intended.

SUMMARY OF VARIOUS EMBODIMENTS

Certain exemplary embodiments of the invention uniquely combine the machine-readability of a code with the versatility of adhesive or hook-and-loop tape, specifically by producing tape with a pattern that can be divided into multiple, variable-length segments (e.g., by tearing off sections of the tape at arbitrary locations as is generally done when using a roll of tape), with each segment including one or more unique codes that can be scanned/identified and associated with digital information. Such "digital tape" can be used with an associated software "app" for accessing and storing digital information relating to an object to which a segment of the tape is affixed. Unlike individually-coded labels, tape is more easily accessible, rugged, and durable, will stick to almost anything it is attached to, and is variable in length (e.g., can be sold in different length rolls and can be torn into different length sections). Among other things, this unique, variable length capability allows the entire code to wrap around objects, making it viewable from different angles. For example, a box with a length of this tape wrapped around its circumference will be able to be read from any side of the box.

Embodiments can be implemented using virtually any type of tape. Duct tape is considered a good candidate for implementation due to its ruggedness, versatility, and existing market penetration, although the inventors envision implementation using virtually any type of tape, e.g., masking tape, gaffer tape, vinyl tape, packaging tape, strapping tape, water activated tape, pressure sensitive tape, etc. Generally speaking, tape can be characterized as a 3-dimensional rectangular object with a high aspect ratio, i.e., its x:y dimension aspect ratio is very high and its y:z dimension aspect ratio is also very high such that x>>y>>z. For example, the x (length) dimension is typically specified in yards, the y (width) dimension is typically specified in inches, and the z (thickness) dimension is typically specified in "mil"s. Tape typically has an adhesive layer, which generally means that at least one of its x-y surfaces is sticky and adheres to certain types of surfaces, for example glass, plastic, wood, metal, etc. Some tapes are double-sided, e.g., having two sticky x-y surfaces. Tape is generally provided on a roll (e.g., the tape is wound around itself, typically on a hollow cylindrical core), although the present invention is not limited to rolled tape.

Exemplary embodiments of the present invention also include related apparatus for scanning and processing such segments and for associating information with such segments. For example, certain exemplary embodiments provide a cloud-based software solution and related "app" that allows users to take any length of tape and assign that entire segment to point to a unique digital address where they can store information, e.g., using the "app" on a smartphone or tablet to scan the code and storing associated information in the cloud.

Thus, exemplary embodiments capture many benefits of prior approaches into a single product. These collective benefits include: expeditious use without any additional steps or printing equipment, smartphone software readily integrated with the machine-readable code, strong adhesive backing for highly flexible application to many surfaces, built in ruggedness and water resistance, and the ability to customize the size and length of a single code.

Some aspects and advantages of various exemplary embodiments are now described.

Generally speaking, the described solution differs from prior approaches by using specialty tape as the physical medium to employ the machine-readable code. In addition to this, the physical product is integrated with smartphone software or other "app" to assist in data management. Among other things, this tape medium allows full use of the code in an expeditious manner (e.g., for a customer on the move), and removes the required steps of downloading, printing, applying adhesive, and creating an accompanying digital address to obtain the full value of the product. Also, this tape medium allows several hundreds of unique codes to be self-contained in one unit of product (e.g., a roll of tape). This helps provide more life and user flexibility per unit of product and considerably brings down the cost per unique code.

Furthermore, the strong adhesive or hook-and-loop backing to the code allows it to be reliably attached to many different surfaces, making it more versatile than a traditional label. Also, the unique machine-readable pattern on the tape allows one single code to be customized to any length along the tape, and, in certain embodiments, can be cut or torn down to very small sizes (e.g., 2 cm by 2 cm), opening up many more possibilities as to how it can be employed. Generally speaking, the minimum length containing 1 unique code is a design parameter that can be adjusted or selected for a given application. Thus, for a specific embodiment, there generally is a specific minimum length that contains an entire, unique code.

Certain exemplary embodiments include a tape that has a varying pattern along the length such that any unit length of the tape greater than the length of 1 unique code comprises a unique pattern, and this pattern is machine-detectable from at least one side of the tape. In certain exemplary embodiments, the tape is comprised of discrete "cells" (e.g., rectangular or square cells), with each cell containing a pattern that is unique from every other cell in the tape (although not necessarily universally unique). The uniqueness of each cell allows for it to be machine-readable, e.g., using a camera with image processing software such as the above-mentioned app running on a smartphone or table. Such cells may (but are not required to) span the width (y-dimension) of the tape, and many adjacent cells generally line the entire length (x-dimension) of the tape. Adjacent cells can be arranged with little or no space between successive cells or can be arranged with gaps between successive cells, e.g., with a demarcation (e.g., a solid color strip or other indication) to allow for visually identifying the start/end of a cell and to provide room for a user to tear or cut the tape between cells). The present invention is not limited to any particular arrangement or spacing of codes or cells on a length of tape.

As mentioned above, certain exemplary embodiments provide a cloud-based solution accessible to the user through a downloadable smartphone application (e.g., Android and iOS App). The software allows the user to interact with the article digitally. The software, for example, through the smartphone's camera, is designed to 'read' the unique pattern within each cell and recognize it as having a unique identity (a 'code'). This unique identity points to a unique digital address on the cloud database and provides the ability to associate any type of digital information with the machine-readable code, and hence with the object, including such things as product information (e.g., product description, pricing, etc.), inventory/tracking information (e.g., object location), documents, images, videos, audio files, etc. In this way, a user with a smartphone or tablet and the app is able to read a cell's code on the tape and access information assigned to that code.

Unlike a barcode or QR code, however, exemplary embodiments allow the user to associate multiple adjacent codes on the tape to the same information. For example, a user can assign four adjacent codes to hold the same information. If any one of these four codes is now scanned, it will point to that information. This unique capability allows for variable length 'macro'-codes. For example, a user can cut a section of tape that contains 10 codes and assign them all to point to the same information. When a user then 'reads' that section of tape, it acts as one macro-code that points to the defined information. Additionally, in an exemplary embodiment, the user is able to edit information assigned to macro-codes via the app or other user interface (e.g., some information may be updated through a back-end administrative interface such that an administrator can control the content provided to users who scan a given portion of tape).

Without limitation, the following are some ways in which a macro-code can be recorded such as for use by the cloud-based system. If, for example, the tape has a non-repeating pattern, then a segment of the tape (e.g., torn from a tape roll) can be scanned (e.g., using the smartphone camera) to record the entire pattern on that segment or even just a portion of the pattern on that segment, and then digital information can be associated with the recorded pattern. If, for example, the tape has a sequence of codes, then all of the codes on a segment of the tape (e.g., torn from a tape roll) could be determined, for example, by scanning the entire segment (in which case all of the individual codes could be read), by receiving a scan of just the first and last codes from the segment (in which case the entire sequence of codes on the segment between the first and last codes, inclusive, could be determined), or by receiving a scan of the first code and an indication of the number of codes on the segment (in which case, again, the entire sequence of codes on the segment could be determined). Generally speaking (and perhaps typically), the segment or segment portion could be scanned after the tape is applied to the object (e.g., if the object is a box with a length of this tape wrapped around its circumference, then all sides of the box could be scanned to record the entire pattern), although, for example, the first code of a segment could be scanned while the start of the tape segment is still on the roll and the last segment could be scanned either while the end of the tape segment is still on the roll or after it is applied to the object. Overall, the present invention is not limited to any particular way of recording a code or macro-code associated with a segment of tape.

The user can apply a length of tape encompassing one or more codes/cells to an object. Preferably, the user will tear or cut the tape at a designated location such as one of the demarcation lines shown in FIG. 32 and FIG. 39, but in the event the user happens to tear or cut away from a designated location such that one or more cells are damaged (e.g., torn into two sections or distorted due to stretching), then the affected cell(s) may be unscannable/unusable but the remaining code(s)/cell(s) on a length of tape still may be scannable/usable.

In accordance with one embodiment of the invention, an encoded tape comprises at least one fastener material on at least one surface of the tape and a non-repetitive varying pattern on at least one surface of the tape, the non-repetitive varying pattern encoding a plurality of different machine-readable codes, wherein the tape is separable into a plurality of arbitrary length segments including distinct sets of machine-readable codes that uniquely identify each such segment from other such segments of the tape.

In various alternative embodiments, the pattern may be printed on a visible surface of the tape and/or may be machine-detectable from at least one side of the tape. The pattern on the tape embodying the machine-readable codes may be of any form described herein. The non-repetitive varying pattern may include a plurality of unique codes arranged successively along a longitudinal portion of the tape in both length and width. The unique codes may encompass substantially equal lengths of the tape, for example, the pattern may comprise adjacent cells of length and width equal to the width of the tape, each cell including at least one machine-readable code. The pattern may comprise parallel and orthogonal lines, which may cover substantially the entire length and width of the tape. The unique codes may be arranged with little to no space between adjacent codes or may be arranged with a gap between adjacent codes. The pattern may include demarcations identifying locations of the machine-readable codes on the tape. The pattern on the tape may not be visually discernible by a human as including the presence of machine-readable codes, for example, because the pattern does not look like a code or because the pattern on the tape is outside of the visual spectrum such that the presence of machine-readable codes on the tape is not visually discernible by a human.

In any of the described embodiments, the at least one fastener material may include an adhesive (e.g., a pressure sensitive material, an adhesive that does not leave residue on at least one selective surface to be taped, a water activated adhesive, etc.), hook and loop fasteners, or other appropriate fastener materials. The tape may be provided in rolled form.

In accordance with another embodiment of the invention, an image processing system comprises an image scanner configured to provide at least one scanned image of at least a portion of an arbitrary length segment of the tape of claim 1 and an image processor configured to receive the at least one scanned image, identify the distinct set of machine-readable codes on the arbitrary length segment of the tape based on the at least one scanned image, associate the distinct set of machine-readable codes with a common set of digital addresses, subsequently receive an input identifying any one or more of the distinct set of machine-readable codes associated with the arbitrary length segment of the tape, and, in response to receiving the input, providing user access to at least one member of the common set of digital addresses via a user interface of a user device.

In various alternative embodiments, the image processor may be further configured to receive and store information for a given one of the common set of digital address prior to receiving the input, such that access to the stored information is provided in response to the input. The input may comprise a photographic or videographic scan of at least a portion of the arbitrary section of tape. The at least one scanned image may include images scanned at a first location and at a second location of the arbitrary section of the tape, in which case the image processor may be further configured to identify a first machine-readable code at the first location, identify a second machine-readable code at the second location, and infer at least one additional machine-readable code between the first and second machine-readable codes.

In accordance with another embodiment of the invention, a method comprises receiving at least one scanned image of at least a portion of an arbitrary length segment of the tape of claim 1; identifying the distinct set of machine-readable codes on the arbitrary length segment of the tape based on the at least one scanned image; associating the distinct set of machine-readable codes with a common set of digital addresses; subsequently receiving an input identifying any one or more of the distinct set of machine-readable codes associated with the arbitrary length segment of the tape; and in response to receiving the input, providing user access to at least one member of the common set of digital addresses via a user interface of a user device.

In various alternative embodiments, the method may further comprise, prior to receiving the input, receiving and storing information for a given one of the common set of digital addresses, such that access to the stored information is provided in response to the input. The input may comprise a photographic or videographic scan of at least a portion of the arbitrary section of tape. Scanning at least a portion of the arbitrary section of the tape may comprise scanning the arbitrary section of tape at a first location and at a second location, in which case identifying the distinct set of machine-readable codes on the arbitrary section of the tape may comprise identifying a first machine-readable code at the first location, identifying a second machine-readable code at the second location, and inferring at least one additional machine-readable code between the first and second machine-readable codes.

In accordance with another embodiment of the invention, an encoded tape comprises at least one fastener material on at least one surface of the tape and also comprises repeated, identical, machine-readable codes along a longitudinal portion of at least one surface of the tape, wherein the tape is separable into a plurality of arbitrary length segments, each arbitrary length segment including at least one of the repeated, identical, machine-readable codes, such that different such segments are attachable to different objects to associate such objects with a common set of digital addresses associated with the machine-readable codes.

In various alternative embodiments, the at least one fastener material may include an adhesive and/or hook fasteners and loop fasteners. The pattern on the tape embodying the machine-readable codes may be of any form described herein. The tape may be provided in rolled form. Image processing systems and image processors of the types described herein can be used with such tapes having repeated, identical, machine-readable codes in a manner similar to those used for tapes having non-repetitive varying patterns.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 22 is an illustration that demonstrates how CMRCT is still able to function as intended even if a significant amount of aggregate is damaged or unobservable.

FIG. 23 is an illustration that demonstrates how current unique machine-readable code in the form of QR code or barcode is unable to function as intended with a significant amount of damage or unobservability.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

1. Introduction

Figure 1:
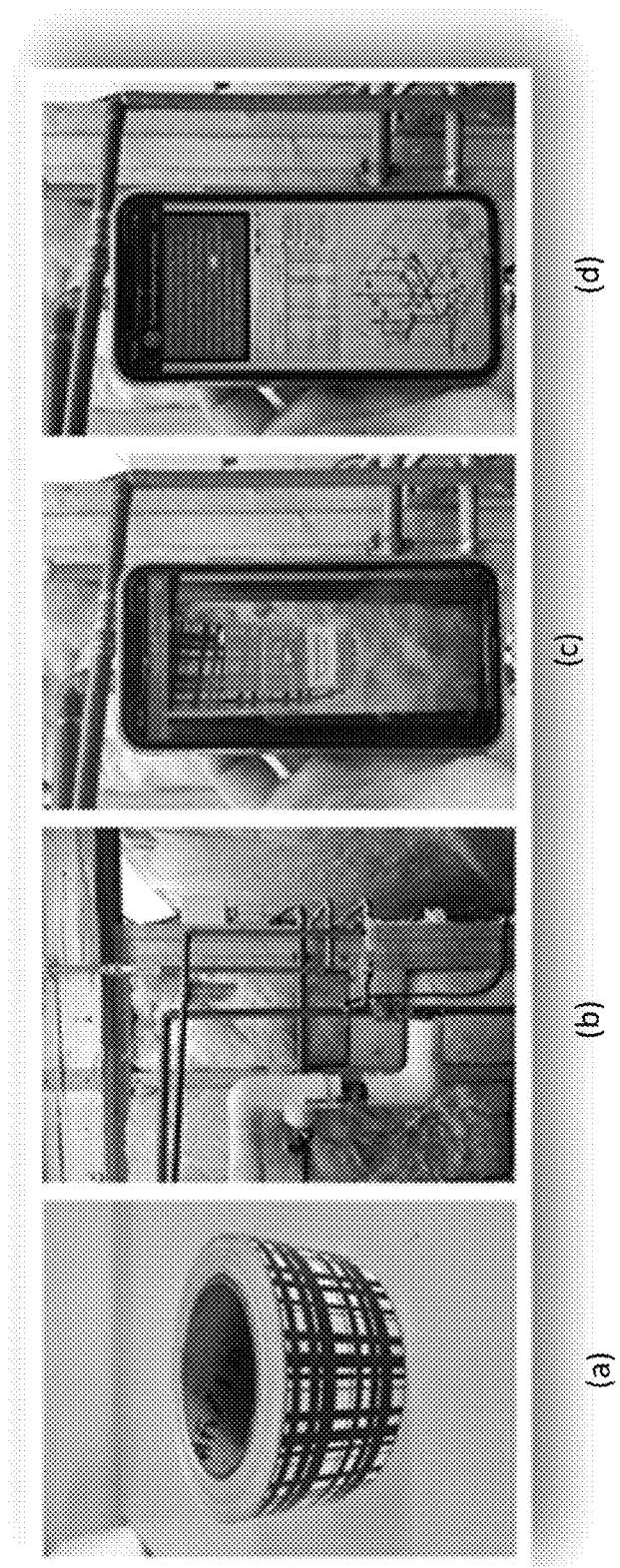
FIG. 1 shows a complete example of how Continuous Machine-Readable Code on Tape (CMRCT) can be used to organize digital content according to the physical world in which it resides, in accordance with one exemplary embodiment.

For purposes of this discussion and claims, a "set" is defined as including one or more members.

Existing machine-readable codes such as barcodes and QR codes have both form factor and process constraints that prevent them from achieving full adoption and everyday use across the consumer, commercial and industry spaces. These constraints, and therefore lack of everyday adoption, significantly limit the productivity gains that machine-readable code could offer.

Exemplary embodiments, which, for convenience, are referred to herein as Continuous Machine-Readable Code on Tape (CMRCT) or, in some cases, as "digital tape," are rooted in existing technologies such as QR code or barcode but add subtle yet meaningful capabilities to improve upon three core concepts; versatility, accessibility and reliability. By improving upon these core concepts, CMRCT encourages everyday adoption, which in turn stimulates significant gains in productivity across 'hands on' industries such as construction, oil and gas, or military logistics. To achieve this, CMRCT alters both the physical form factor as well as the processes by which a machine-readable code is read by a compatible device such as a barcode reader, surveillance camera system, or smart device camera (referred to herein generically as a code reader device). These fundamental changes can be summarized as follows:

1. CMRCT uses a single, physical embodiment that compiles independent machine-readable codes together with little to no space in between codes. This physical embodiment is in two primary forms—adhesive tape or fabric strips with hook and loop backing.
2. CMRCT uses a process by which a code reader device, with software compatible with the machine-readable codes, can rapidly or simultaneously aggregate independent codes together on the physical embodiment in order to assign them to one or more digital addresses.

The changes in physical form factor as well as the aggregate process will be described in more detail later, however the primary objective of CMRCT is worth stating upfront to fully appreciate the usefulness of these changes. By making these changes, CMRCT enables machine readable code to be rugged, reliable, and rapidly accessible in a tool kit, such that any user can rapidly attach digital content to physical locations and share the content across a network, as easily as one can use a sticky note. The digital content can include, but is not limited to, voice memos, photographs, images, spreadsheets, or videos.

CMRCT allows a user to organize and share digital content over a network, but also adds a physical dimension to this process. Generally speaking, digital content on computers such as desktop computers and smart devices is organized using an operating system alone. To find information, a user must navigate this operating system to find information and, if this information relates to a physical object or location, a user must manually cross reference this information to the respective physical object or location.

CMRCT effectively removes this cross-reference process by physically attaching digital content to its respective physical counterpart, using adhesive tape or fabric strips with hook and loop backing as the physical medium to do this. By doing so, it allows a user to rapidly assign, share or pull digital information from an exact physical location relevant to that digital content. In effect, CMRCT uses the physical world as the primary means for organizing digital content. The real world becomes the new desktop and filing system.

FIG. 1 shows a set of photographs showing an example of one of the embodiments of CMRCT and how it can be used to assign digital content to a precise physical location relevant to such content. FIG. 1(a) shows an example of CMRCT as a continuous machine-readable code on adhesive tape. In this example, duct tape is used, since it is physically tough and sticks to most surfaces reliably. FIG. 1(b) shows an example of the machine-readable code (i.e., pattern), using duct tape as a physical medium, attached and therefore assigned to a precise location such as a water pipe. FIG. 1(c) shows a code reader device with compatible software that is configured to scan and decode the unique code(s) assigned to the tape, and to retrieve a digital video from a cloud or local database. In this example, the digital video had previously been assigned to this unique code on the tape. This video could, for example, describe how to install the very piping system it is attached to. FIG. 1(d) shows that the user can tap on the augmented reality image hovering over the tape to watch the video, or even access more digital content relating to the piping system, such as conversation threads, spreadsheets, or a piping schematic. A user can edit, delete, or share this information over a network, such that physical presence is not necessarily required to engage with the content on the tape. In this example, instead of a user looking for a file on a computer aptly titled "water piping system' and cross referencing it to the physical one, the user takes a shortcut by scanning the code on the adhesive tape and thereby directly finding the water piping system in question and pulling the relevant digital content associated with it.

Figure 2:
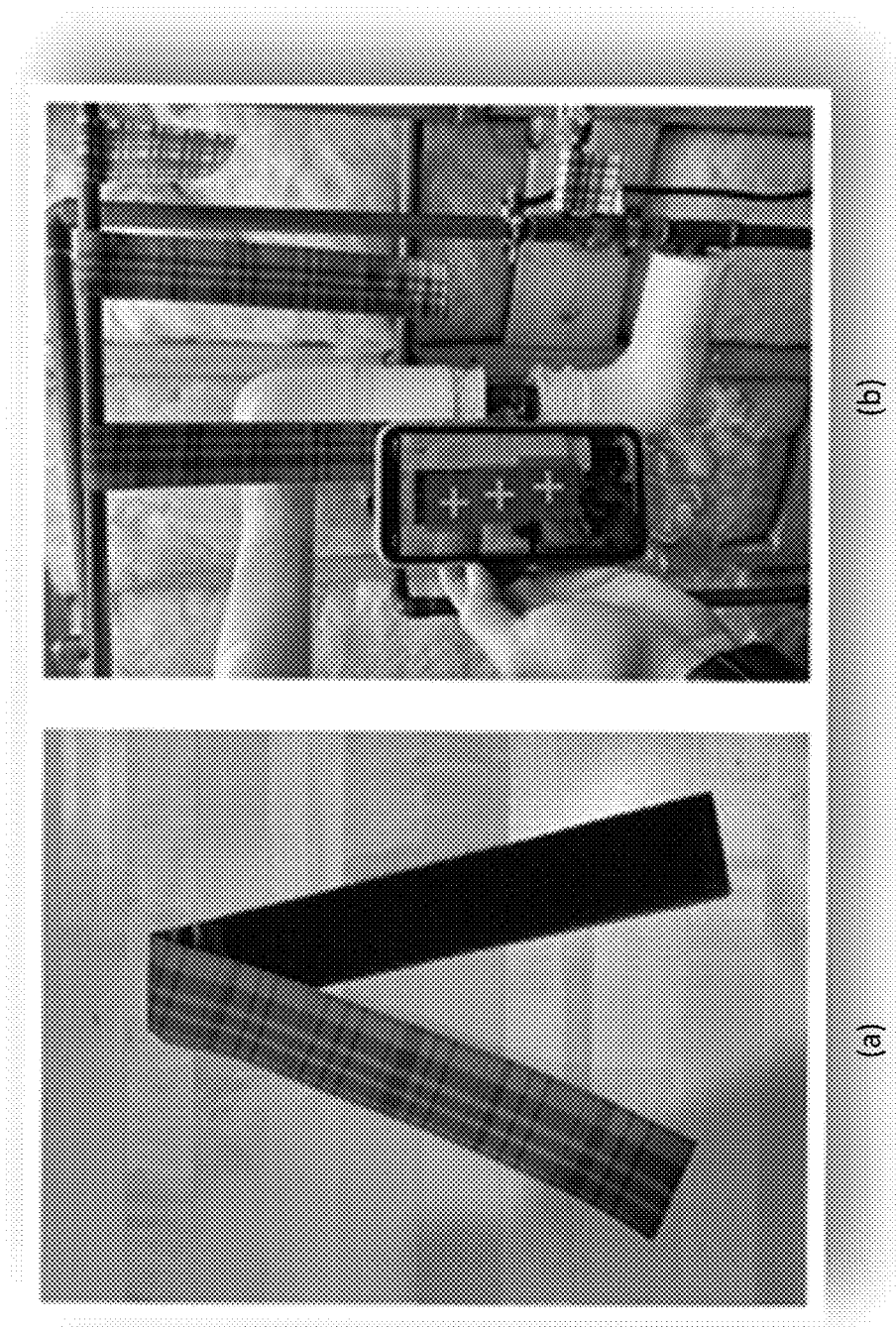
FIG. 2 shows a similar system to FIG. 1, however instead of an adhesive tape, CMRCT uses a fabric strip with hook and look backing that can secure to precise, physical locations and can tie/organize digital content to the physical world in which it relates.
Figure 3:
FIG. 3 shows some of the more common examples of how machine-readable code is used as known in the art.

FIG. 2 is a photograph showing an alternative form factor for CMRCT, which happens to use the same process as the adhesive tape for assigning digital content to machine readable codes. This form factor is a fabric strip with hook and loop backing that enables it to wrap around objects and secure itself through the hook and loop mechanism. FIG. 2(a) shows an example of CMRCT used on a fabric strip with a machine-readable pattern woven into the strip. The strip has a hook and loop backing such that one part of the hook section can attach to other loop section located on the same piece of fabric. FIG. 2(b) shows an example of a CMRCT fabric strip attached to a copper pipe. The hook and loop mechanism allows easy attachment to and removal from certain types of physical objects or locations. The process by which this embodiment is used to organize and share digital content over a network is similar to the tape.

In industries that are highly physical in nature, such as commercial logisitics or construction, organizing information in such a way as to minimize the time required to access relevant digital content (i.e., minimize cross referencing time) vastly improves productivity. A McKinsey Report, for instance, valued the current gap in global construction productivity at $1.6 trillion.

4. Description of Continuous Machine-Readable Code on Tape (CMRCT)

Figure 9:
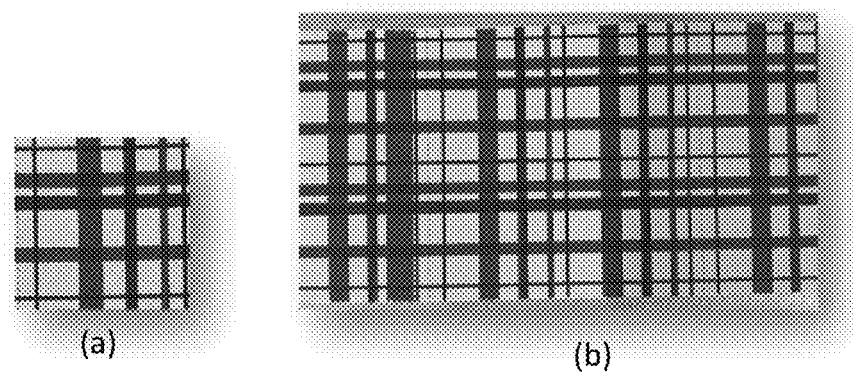
FIG. 9 shows an example of a single code (i.e., pattern) and multiple codes that have little to no spacing in between individual codes, in accordance with an exemplary embodiment.
Figure 10:
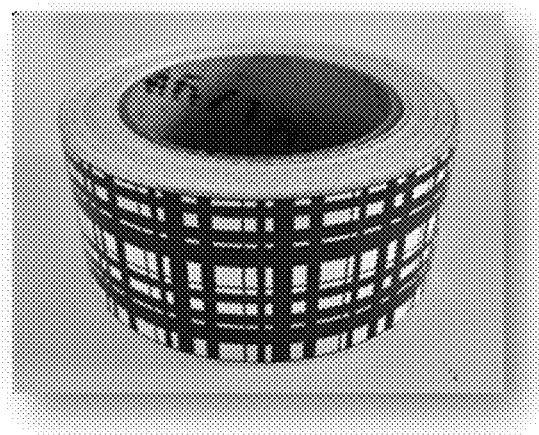
FIG. 10 shows a photograph of an example embodiment of CMRCT.
Figure 11:
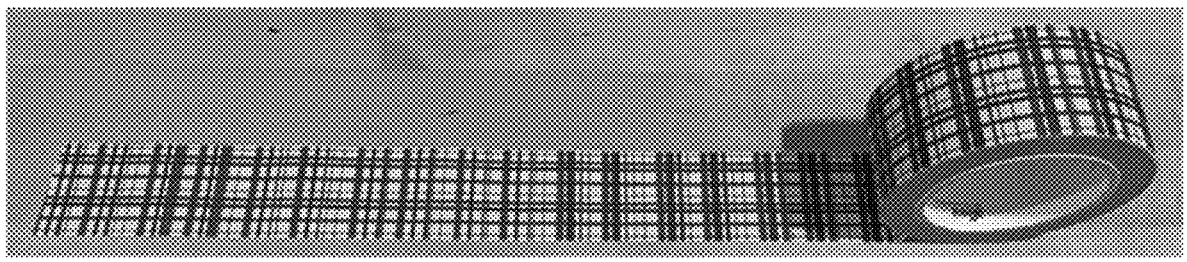
FIG. 11 shows a roll of CMRCT as in FIG. 10 partially unfurled and showing multiple codes physically attached with little to no spacing in between codes.
Figure 12:
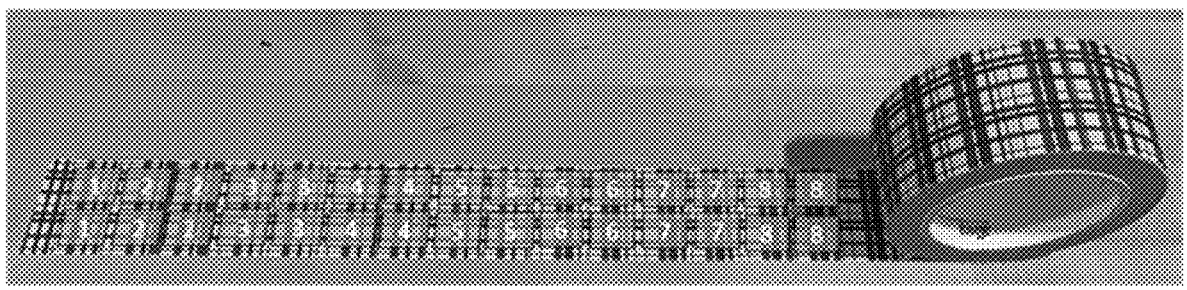
FIG. 12 uses the same photograph as FIG. 11, but uses transparent cells to clearly indicate how individual codes could be arranged, in accordance with an exemplary embodiment.
Figure 13:
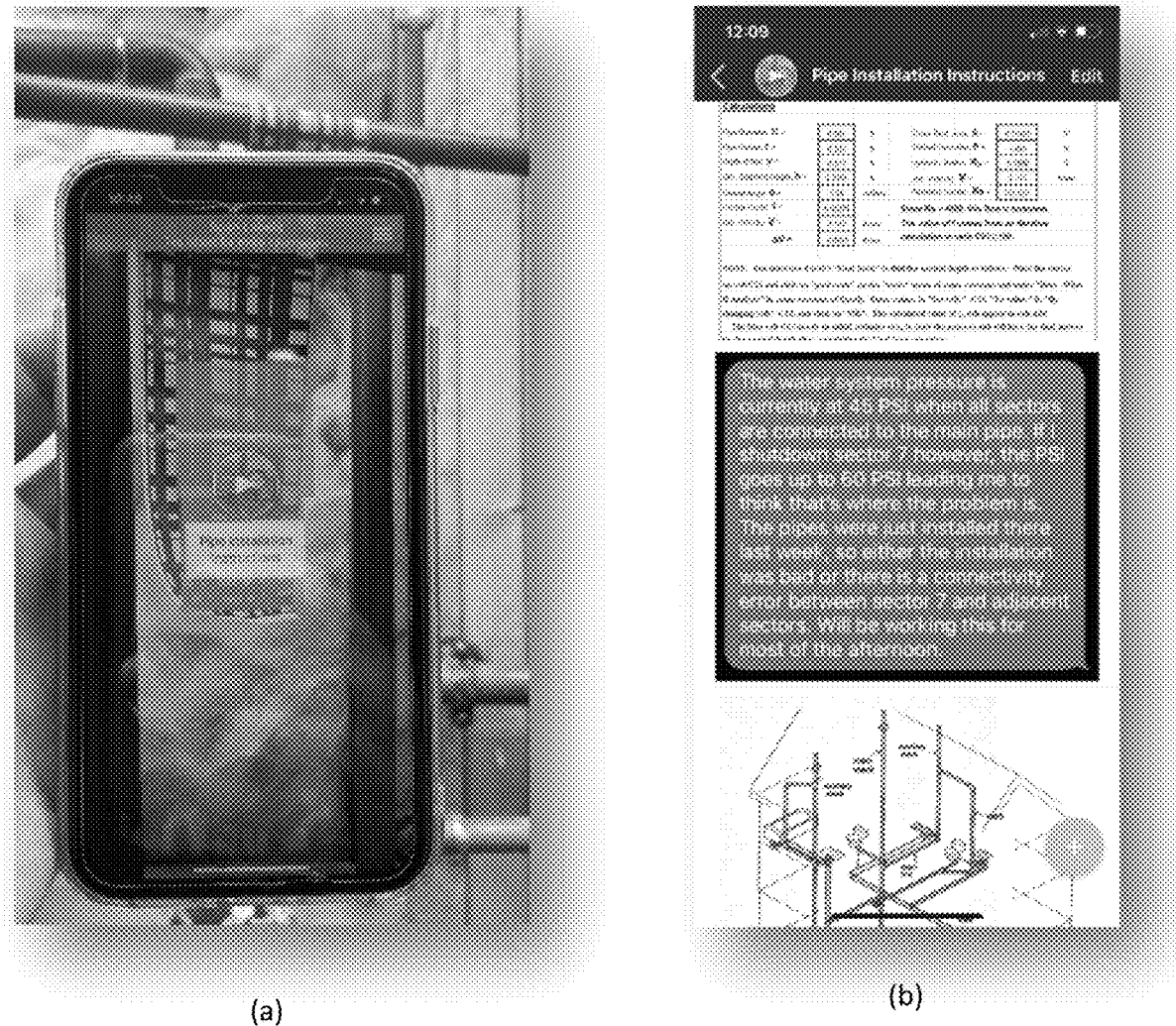
FIG. 13 shows different examples of what a digital address could look like, in accordance with an exemplary embodiment.
Figure 14:
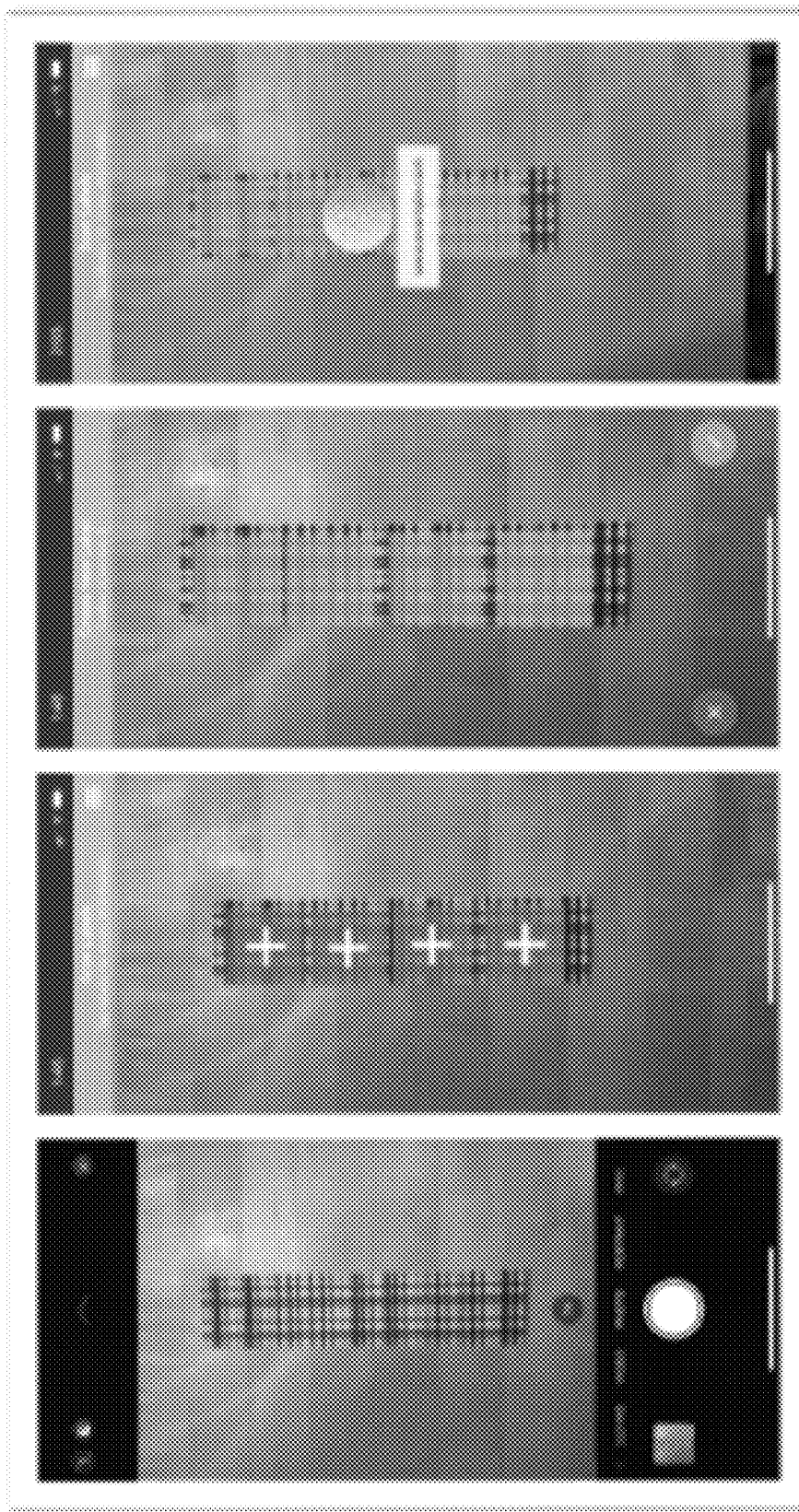
FIG. 14 shows actual screenshots of the aggregate effect in action using a piece of CMRCT and a smart device with the compatible software application and using augmented reality to illustrate how the aggregate effect works for the user, in accordance with an exemplary embodiment.

CMRCT is a product (i.e., adhesive tape or fabric strip with hook and loop backing) that attaches individual and discrete codes together with little to no separation between adjacent codes, coupled with a process that enables a code reader device to rapidly or simultaneously scan and aggregate multiple codes on an arbitrary segment of the physical product, with the purpose of assigning one or more digital addresses to each code rapidly or simultaneously. FIG. 9 shows in FIG. 9(a) an example of a single code (i.e., unique pattern) and in FIG. 9(b) a group of codes physically attached with little to no spacing in between codes, in accordance with one exemplary embodiment. In these examples, the codes are in the form of plaid codes (discussed in greater detail below), although embodiments can use these or other types of machine readable codes as discussed generally herein. FIG. 10 is a photograph showing an example CMRCT embodiment with unique machine readable codes of the types shown in FIG. 9 physically attached to one another and printed on one side of an adhesive tape. In this exemplary embodiment, the individual cells containing a unique pattern are 2.5×2.5 cm, with 4 of the same unique codes grouped into a cluster measuring 5×5 cm, such that one grouping of unique cells can be contained in a single 5 cm width of tape. Of note, the inventors intend on using different types of unique machine-readable codes contained within a cell, along with different combinations of the same unique codes grouped together, different cell sizes and different cell shapes. Such codes can be printed on one or both sides of the tape. FIG. 11 is a photograph showing an example embodiment of the type shown in FIG. 10 partially unfurled. The exemplary embodiment shown in FIGS. 9-11 includes an arrangement of machine readable codes that are physically attached with little to no separation between the codes. FIG. 12 shows the photograph of FIG. 11 annotated with transparent boxes showing the locations of discrete machine readable codes that are physically attached with little to no separation between each code. Codes that are physically attached can be different from one another, or in some cases, can be the same. In this example, each number represents a unique code (i.e., machine readable pattern) such that the same number used multiple times represents the same code, and different numbers represent different codes. CMRCT can use any type of arrangement for individual and unique codes, including repeating the same code more than once. FIG. 13 shows an exemplary of what a digital address can represent, where FIG. 13(a) shows an example of a single digital address assigned to a piece of CMRCT in which the digital address is presented to the user as a set of colored augmented reality boxes and an upfront image with text, and FIG. 13(b) shows another example of how the same digital address assigned to a piece of CMRCT can be presented differently, where, in this example, the digital address is presented to the user as a collection of digital content including a spreadsheet, a text box, and a schematic, and all three of these items fall under the same digital address. There is no limit on the type(s) or amount of digital content that can be assigned to a single digital address. A digital address, as it relates to CMRCT, is defined as a collection of digital content grouped together on a single address located on a database, where a digital address can be associated with a single machine readable code or with multiple machine readable codes. FIG. 14 shows examples of actual screenshots from a scanner device (in this case, a smartphone device), with software compatible with CMRCT assigning one digital address to multiple codes that are physically attached on an arbitrary piece of CMRCT, where FIG. 14(a) shows an example with multiple codes physically attached to one another on an arbitrary piece of CMRCT with little to no spacing in between codes, FIG. 14(b) schematically shows a representation of a code reader device with software compatible with CMRCT identifying four unique groupings of machine readable codes on the arbitrary piece of CMRCT in FIG. 14(a) with augmented reality '+' signs representing each group of similar code (note, this type of augmented reality user interface is an optional feature of CMRCT and the CMRCT process is not limited to augmented reality interface—embodiments need not identify the detected codes to the user), FIG. 14(c) schematically shows a representation of a code reader device, compatible with CMRCT, simultaneously or very rapidly aggregating the codes into one as represented by the four boxes, and FIG. 14(d) schematically shows a representation of a code reader device, compatible with CMRCT, assigning a single digital address (e.g., www.example.com) to the aggregated codes. In this exemplary embodiment, all unique codes on this arbitrary piece of CMRCT are now assigned to www.example.com. Though augmented reality is included in the user interface in this example, this interface is optional. Furthermore, different systems can be integrated with CMRCT by those of ordinary skill in the art informed by the present invention, such as closed-circuit television (CCTV) and other video/surveillance systems with optical tracking sensors that are fully automated for high throughput tracking. This system would integrate digital information with CMRCT automatically, and without any direct human involvement. In such systems, augmented reality generally would not be a required part of the user interface.

Individual codes on an adhesive tape or fabric strip with hook and loop backing can be arranged in any way, and can be an assortment of unique codes (e.g., a non-repetitive varying pattern, which in some cases can include some number of duplicated codes, such that the tape can be separated into arbitrary length segments including distinct sets of machine-readable codes that uniquely identify each such segment from other such segments of the tape) or repeated codes (e.g., one or more rolls of tape including repeated identical codes such as for using arbitrary lengths of tape on multiple objects so that all of those objects become associated with the same set of digital addresses). For convenience, the process whereby software groups individual codes together and assigns a single digital address to them shall hereby be referred to as the 'aggregate effect.' The aggregate effect can work with one code by itself, but the novel aspect of CMRCT and the aggregate effect is the ability to group more than one individual code and assign them to a single digital address simultaneously or very rapidly. Of note, the aggregate effect is not limited to assigning a group of codes to just a single digital address. Embodiments of the invention can rapidly and simultaneously assign a group of codes to multiple different digital addresses as necessary.

Generally speaking, each aggregate of codes should be different from any other aggregate used on the tape, such that a user attaches different aggregates to different physical assets or locations. The easiest way to think of an aggregate is a piece of tape. A piece of tape can hold a single code, or an assortment of multiple codes, and together they make up an aggregate that is different from any other aggregate on that tape. By ripping a piece of CMRCT, the user creates an aggregate unlike any other on the tape, and this aggregate can function as one complete and unique code.

For example, with reference again to FIG. 12, a user might rip off arbitrary lengths of tape, where each separated portion contains a distinct group of codes (e.g., one portion might contain the code sections with codes 1/2/2/3 and another portion might contain the next successive sections with codes 3/4). In essence, each separated portion then contains a unique aggregated code or codes that can be associated with a digital address. For example, a portion containing the code sections with codes 1/2/2/3 can be interpreted as a unique aggregated code 1/2/2/3 and/or as unique aggregated codes 1/2, 2/2, 2/3, 1/2/2, 2/2/3, and 1/2/2/3. Each of these aggregated codes then can be associated with a common digital address. The code reader device can be configured to read the codes on a portion of tape and decode the aggregated code(s) to access the associated digital address.

In the event that two arbitrary lengths of tape end up with ambiguous code information (e.g., the same code ends up on two different portions of tape such that a particular code on a newly scanned portion of tape is already associated with a previously scanned portion of tape), then the system could notify the user that the newly scanned portion of tape is unusable and a new length of tape needs to be removed and applied to the object. This situation should be rare.

The aggregate effect can be used to enhance the capability of assigning machine-readable codes to relevant physical assets or locations by adding versatility with how the physical form factor is used, and enhancing reliability should the aggregate code be obscured or damaged. This versatility and reliability are explained in more detail in the section titled 'Advantages of CMRCT'. For example, using the above scenario, say that the portion containing the code sections including codes 1/2/2/3 is damaged such that the code 1 is unreadable. The code reader device still could decode the portion using the remaining readable codes (e.g., 2/2, 2/3, or 2/2/3) and provide access to the associated digital address.

Thus, the machine-readable codes of CMRCT can be physically and closely attached to each other, and can be self-contained in a single product that closely resembles a roll of adhesive tape. In other words, the multiple machine-readable codes can be tightly compacted onto one or both physical surfaces of the tape, with at least one side of this surface having an adhesive backing. The present invention is not limited to any particular arrangement or spacing of codes on a length of tape. A surface or surfaces that contain the machine-readable codes can be wound such that the entire length is compacted into a single roll, and the adhesive surface binds the roll so that it does not unfurl. The machine-readable codes being physically attached and tightly compacted on one or more surfaces give the appearance of continuity for the aggregate of machine-readable codes.

The machine-readable codes of CMRCT can also be self-contained in a single embodiment that is a fabric strip with hook and loop on one or both sides. There are no limitations as to the length and width of this fabric strip, however the dimensions generally would be within reason such that, for example, a fabric strip can fit into a standard toolkit. The multiple machine-readable codes are tightly compacted onto one or both physical surfaces, with at least one side of this surface having a patch of hook or loop such that the strap can attach to itself. The present invention is not limited to any particular arrangement or spacing of codes on a length of fabric. The machine-readable codes being physically attached and tightly compacted on one or more surfaces give the appearance of continuity for the aggregate of machine-readable codes.

Figure 15:
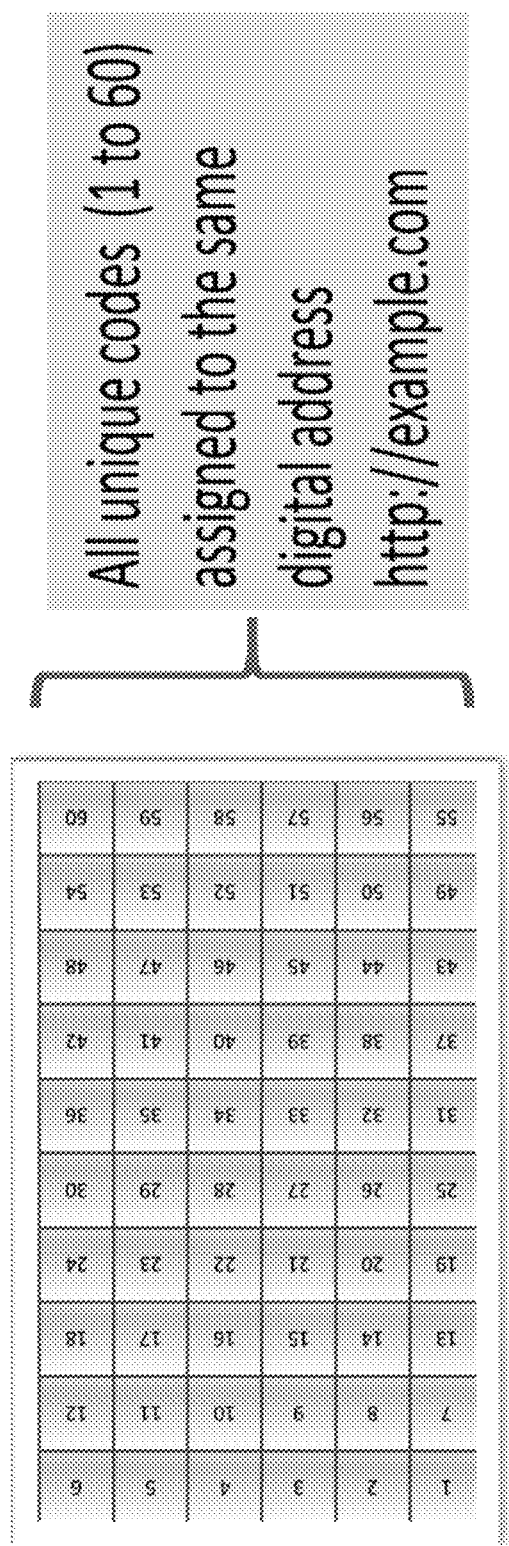
FIG. 15 is an illustration of how unique codes could be organized on one side of the CMRCT, in accordance with an exemplary embodiment.

FIG. 15 shows an example of a section of CMRCT with numbers representing a cell containing a unique machine-readable pattern, and all cells assigned to the same digital address. In this example, no cell with its respective pattern is similar to any other cell on this surface. A cell with its respective pattern could represent, but is not limited to, a separate and unique barcode or QR code. In other words, a cell could contain any type of machine-readable pattern. This example shows a piece of CMRCT that uses completely unique machine-readable codes, however CMRCT can use an assortment of codes that are the same or different from one another, such as in the example in FIG. 12. The shape of a cell's perimeter is not limited to being square and instead could take on any shape or any size. Of note, these unique codes are physically attached in one single embodiment with little to no separation between each individual code. One or more of these codes can be scanned rapidly or simultaneously using a machine-readable device, and compatible software on the machine-readable device can aggregate all the codes and assign them to common set of digital addresses that can include one or more digital addresses.

In the embodiment of FIG. 15, the code reader device generally would have software compatible with CMRCT configured to scan and decode unique codes 1 through 60 very rapidly or simultaneously within the parameters of its scanning area. When the machine-readable device reads these unique codes, it performs the aggregate effect by assigning one single digital address to all the observable and readable codes, which, as discussed above, could be assigned to the entire set or to any unique subset of the 60 codes. If the device is unable to scan all the codes successfully, it can be programmed to infer any codes in between a set of successfully scanned codes, since the order of codes is stored in a central database. If the device picks up code 4 and 57 for instance, the software could be programmed such that it can infer codes 5 through 56 also being on the tape. This capability adds a degree of flexibility to the process of scanning CMRCT and also improves the speed of code scanning.

Definition of Adhesive Tape

For purposes of this discussion and claims, adhesive tape is one type of substrate that can be used for embodiments of CMRCT. Generally speaking, tape can be characterized as a 3-dimensional rectangular object with a high aspect ratio, i.e., its x:y dimension aspect ratio is very high and its y:z dimension aspect ratio is also very high such that x>>y>>z. For example, the x (length) dimension is typically specified in yards, the y (width) dimension is typically specified in inches or cm, and the z (thickness) dimension is typically specified in 'mil's. Tape typically has an adhesive layer, which generally means that at least one of its x-y surfaces is sticky and adheres to certain types of surfaces, for example glass, plastic, wood, metal, etc. Some tapes are double sided, e.g., having two sticky x-y surfaces. Tape is generally provided on a roll (e.g. the tape is wound around itself, typically on a hollow cylindrical core), although the present invention is not limited to rolled tape. Embodiments of this invention can also take the form of any type of tape, including but not limited to duct tape, gaffer tape, masking tape, packing tape, electrical tape, filament tape, paper tape, flagging or marking tape, surgical or wound closure tape, painter's tape, and double-sided tape.

Definition of a Fabric Strip with Hook and Loop Backing

For purposes of this discussion and claims, a fabric strip with hook and loop backing is another type of substrate that can be used for embodiments of CMRCT. Generally speaking, the strip can be characterized as a 3-dimensional rectangular object with a high aspect ratio, i.e., its x:y dimension aspect ratio is very high and its y:z dimension aspect ratio is also very high such that x>>y>>z. For example, the x (length) dimension is typically specified in yards, the y (width) dimension is typically specified in inches or cm, and the z (thickness) dimension is typically specified in 'mil's. The fabric strip typically has two separate patches of 'hook and loop' on one or both sides, such that the fabric strip can wrap around objects and adhere to itself. Embodiments of this invention can also take the form of any type of fabric to include, but not limited to, nylon, polyester, cotton, silk, wool, and linen.

Advantages of CMRCT

The CMRCT product and process is specifically designed to overcome all the limitations of unique codes on adhesive labels described previously. A person of ordinary skill in the art will notice that the advantages of CMRCT closely parallel and overcome the limitations of current machine-readable code described previously. Some advantages are described below.

Figure 16:
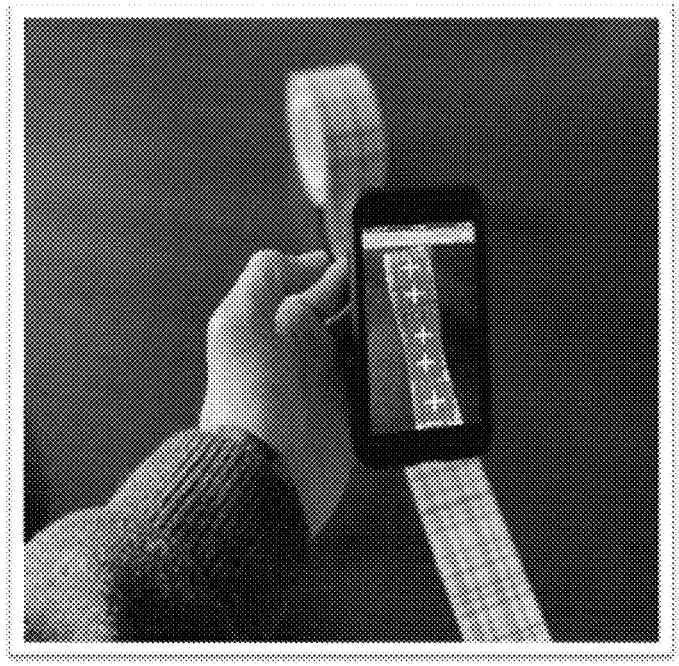
FIG. 16 shows a photograph of unique cells on CMRCT measuring 5×5 cm in area, with each cell containing a unique code represented by an augmented reality '+' sign, in accordance with an exemplary embodiment.

Improved scale: The adhesive tape form factor allows a much greater number of machine-readable codes to be contained in a single unit of adhesive tape. FIG. 16 shows an example photograph demonstrating multiple machine-readable codes contained within a single roll of tape, represented by augmented reality '+' symbols, condensed onto one visible section of CMRCT. In this example, for ease of visualizing, the individual groupings of similar codes have been expanded, e.g., to a 5×5 cm area, but it should be noted that these codes can be condensed into much smaller areas. Even with this larger code size, a number of unique codes can be condensed into a single roll of tape. This ability to compact a large number of machine-readable codes on a single physical surface is mainly due to the unique codes being physically attached with minimal to no breaks in between codes. The smaller and more compact the unique codes are on the surface of the tape, the more unique codes can be contained in a single unit of product. From a scale perspective, this allows the cost per unique code to be driven down appreciably. For instance, a 30-yard roll of tape that measures 5 cm in width and uses 2.5×2.5 cm codes with little to no breaks in between codes could contain 2,194 individual and unique machine-readable codes. If the 30-yard roll of tape was priced at, say, $10, this means each unique code would cost the customer $0.0046.

Convenience and physical ruggedness: CMRCT is also much more conducive to 'on the fly' and rugged use. The CMRCT process uses both adhesive tape and 'hook and loop' fabric strips as the primary form factors.

Figure 4:
FIG. 4 shows a common use case for unique machine-readable codes.
Figure 5:
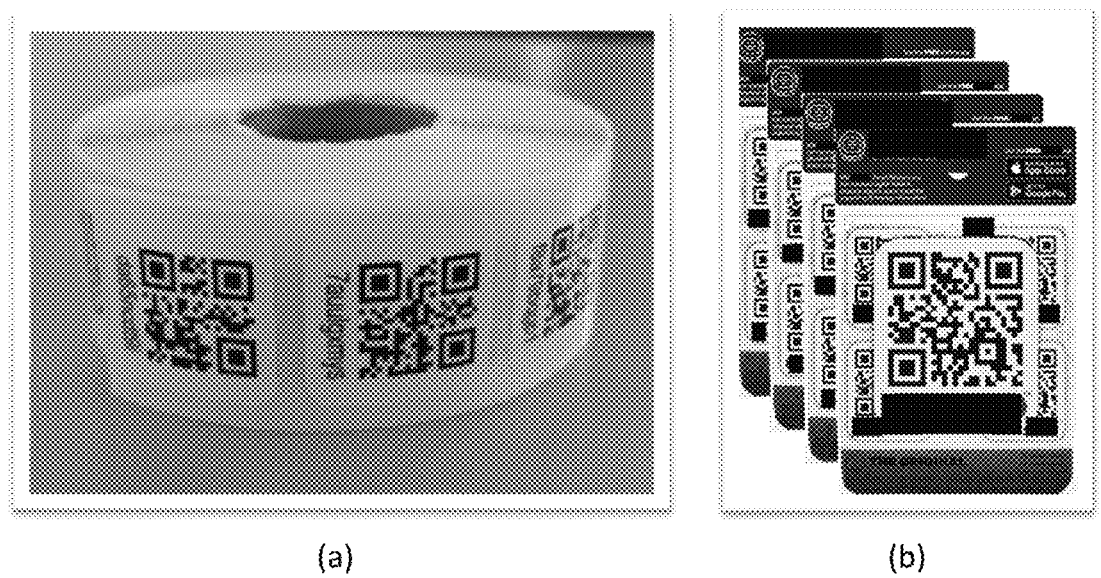
FIG. 5 shows a common embodiment for unique machine-readable code.
Figure 6:
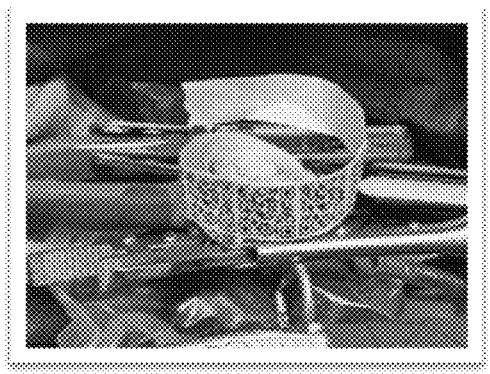
FIG. 6 shows an example of how unique machine-readable codes, in their current and unpackaged form, are not rugged and can become easily damaged when subjected to non-ideal conditions such as being unpackaged and in a toolkit.
Figure 7:
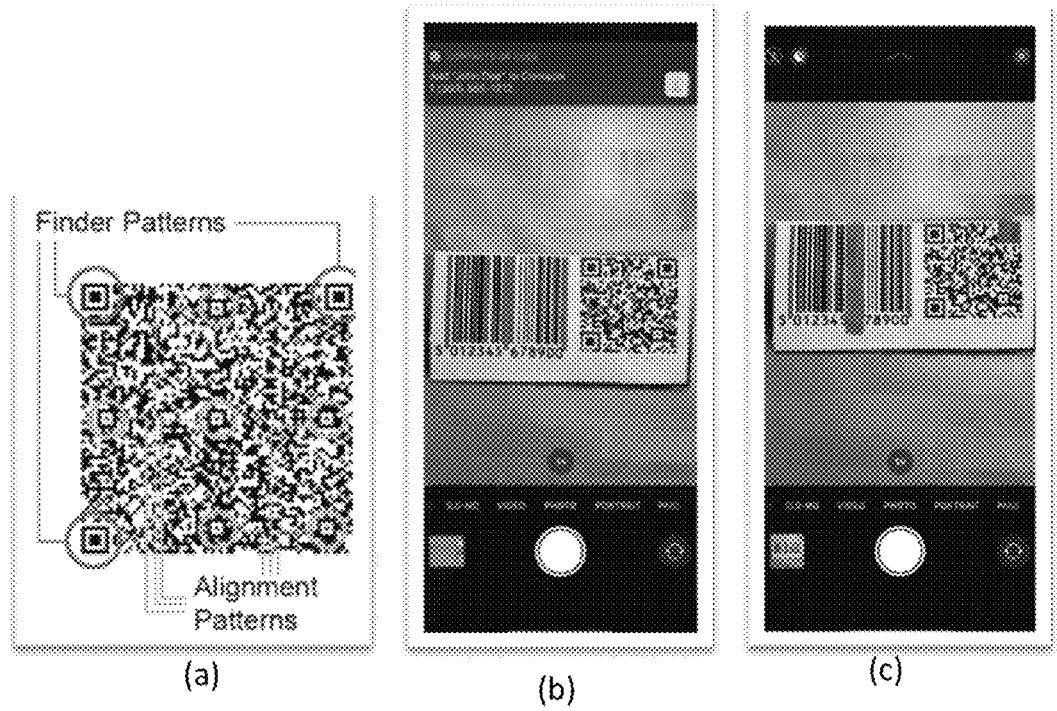
FIG. 7 shows examples of the code limitations with two of the most common machine-readable codes—QR code and Barcode.
Figure 8:
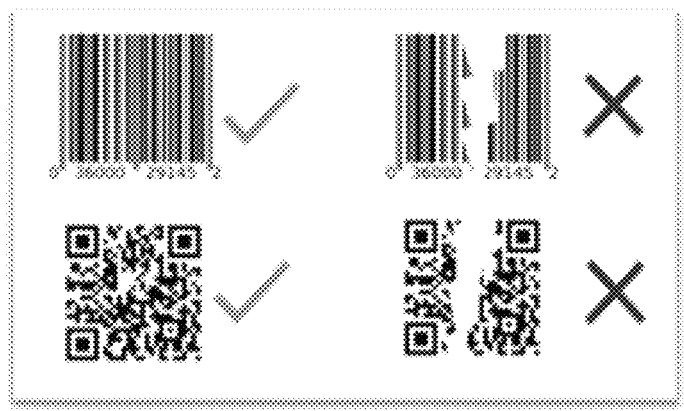
FIG. 8 shows another example of the code limitations with two of the most common machine-readable codes—QR code and Barcode.
Figure 17:
FIG. 17 shows a photograph of an example embodiment of CMRCT in a tool pouch.

Due to adhesive tape typically adhering to itself when rolled (i.e., without a liner), the unpackaged form factor generally prevents any unfurling when, for instance, it is housed in a toolkit or a pocket. Secondly, because the tape is tightly wound with one surface strongly adhered to the other surface beneath it, the tape is unlikely to get wrinkled, bent, or torn when in an unpackaged state and exposed to a harsh environment. In other words, the physical form factor of adhesive tape naturally lends itself to structural integrity. This means users can unpackage the product, store it in an accessible manner, and use it reliably and 'on the fly' without fear of the codes getting physically damaged. FIG. 17 shows an example embodiment of CMRCT housed in a tool pouch. The adhesive tape form factor makes CMRCT a single integral unit, so the code adheres to itself and therefore does not unfurl. The nature of this form factor also ensures the structural integrity of the code, even when unpackaged. It also allows thousands of unique codes to be stored easily in a small volume that fits in something like this pouch. A person of ordinary skill in the art will note how FIG. 4 compares to FIG. 17, with the latter demonstrating how an adhesive tape form factor avoids unfurling and ensures the structural integrity of each unique code so that it can function as intended.

Figure 18:
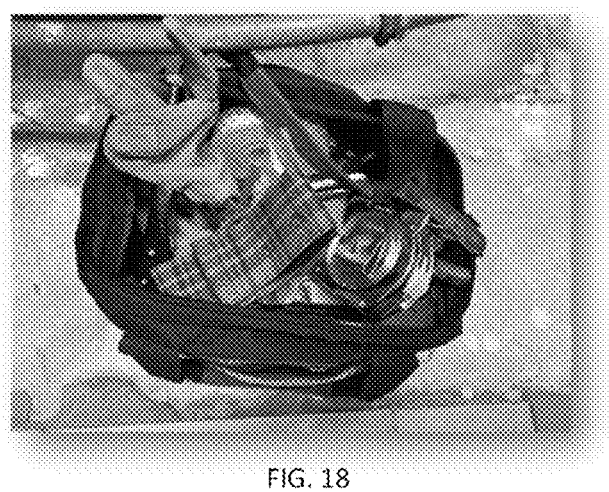
FIG. 18 shows a photograph of an example embodiment of a CMRCT fabric strip in a toolkit.

The fabric strip with hook and loop backing also offers similar ruggedness that the adhesive tape offers. The code, being woven or printed onto the fabric, is unlikely to get torn or bent in such a way that the machine-readable code on the fabric becomes unreadable. This means users can unpackage the product, store it in an accessible manner, and use it reliably and 'on the fly' without fear of the codes getting physically damaged. In other words, the physical form factor of fabric strips naturally lends itself to structural integrity. Furthermore, unlike most tape embodiments, fabric strips generally can be reused more easily. FIG. 18 shows an example embodiment of the fabric strip in a tool kit. A fabric strip form factor gives the CMRCT process a reusable capability. The nature of this form factor also ensures the structural integrity of the code, even when unpackaged. A person of ordinary skill in the art will note how FIG. 4 compares to FIG. 18, with the latter demonstrating how a fabric strip form factor ensures the structural integrity of each unique code.

Figure 19:
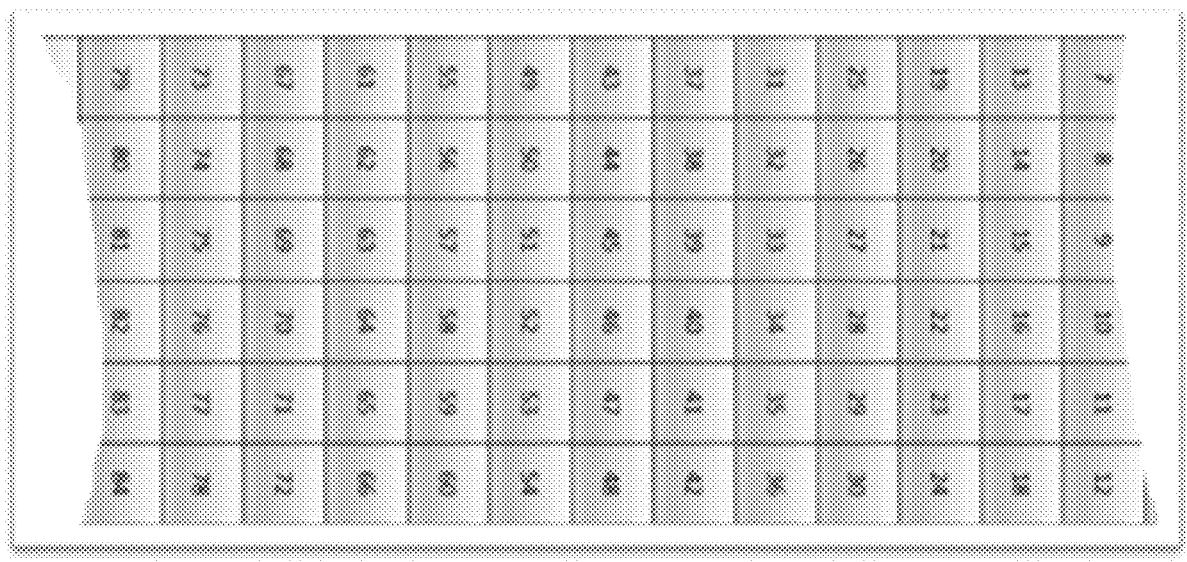
FIG. 19 is an illustration of a ripped piece of CMRCT causing damage to some codes.
Figure 20:
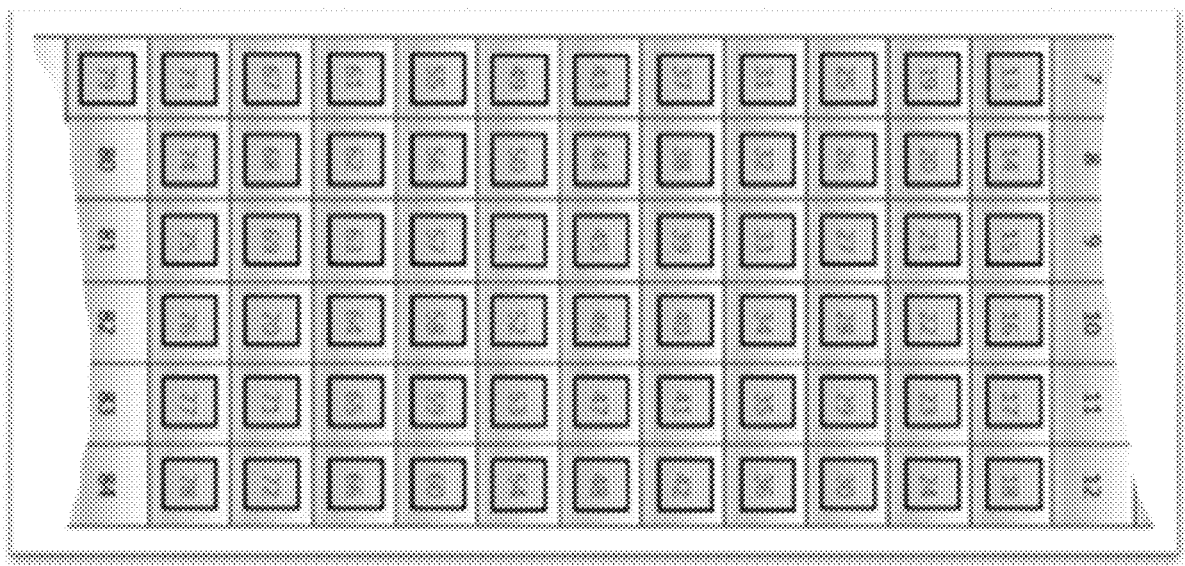
FIG. 20 is an illustration of the ripped piece of CMRCT of FIG. 19 highlighting the codes that remain readable and hence usable due to the aggregate effect.
Figure 21:
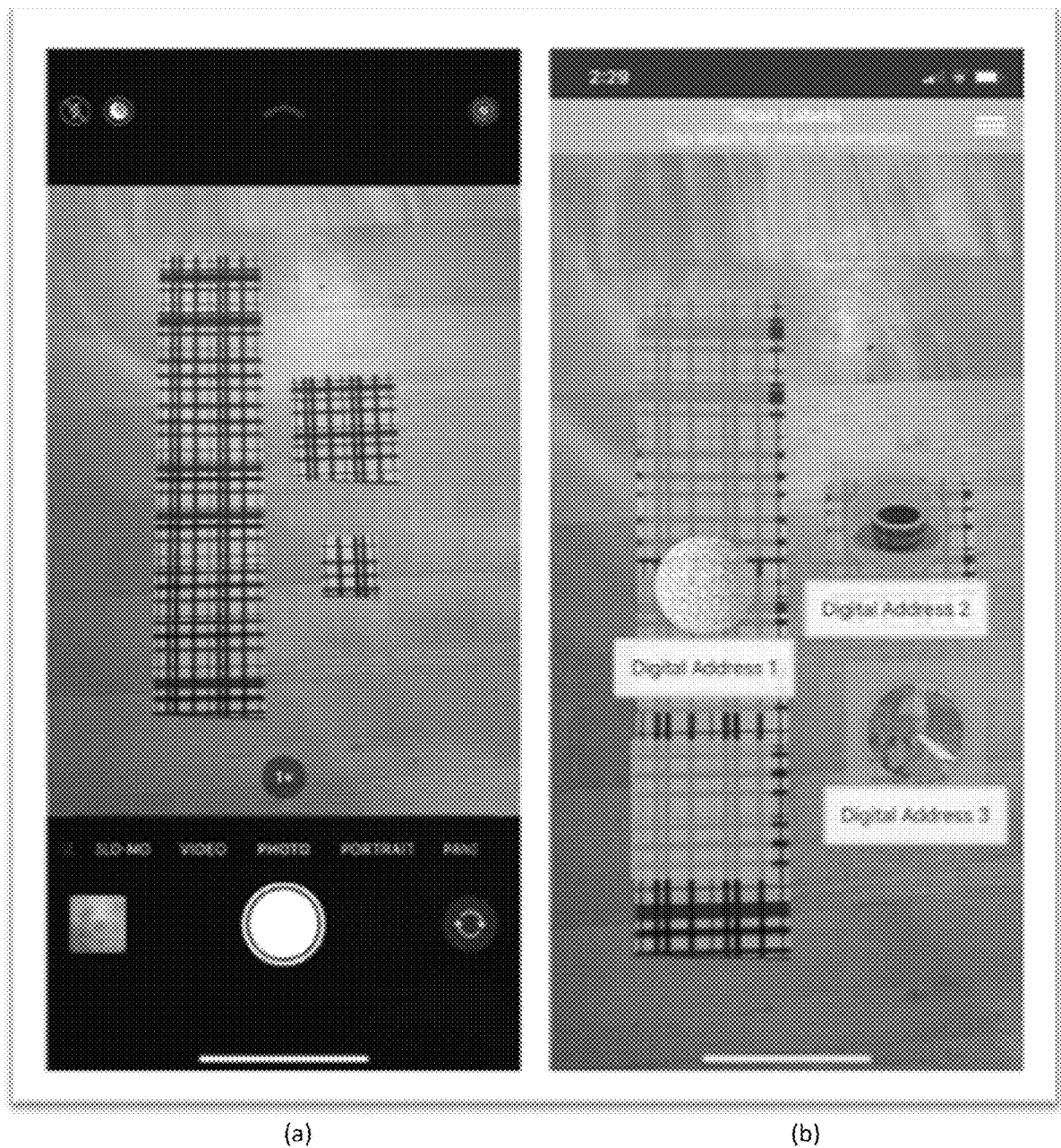
FIG. 21 is an actual screenshot of three different aggregates on three different pieces of CMRCT scanned by a machine-readable device with the compatible software application.

Interaction with multiple codes rapidly: Machine readable codes on CMRCT, being physically attached and compacted onto a single physical layer, allows a machine-readable device, with software that is compatible with CMRCT, to successfully scan and read multiple codes simultaneously or very rapidly. This is useful for a key reason. With CMRCT, and specifically with the adhesive tape form factor, a user can rip a piece of tape that could contain two or more unique and complete codes. FIG. 19 shows an example of a ripped piece of tape including 78 unique codes (i.e., 7 through 84). With these multiple codes tightly compacted on a single physical plane, a machine-readable device, compatible with CMRCT, can successfully scan many or all the codes on the piece of tape simultaneously or very rapidly. In FIG. 19, codes 7-12 and 80-84 are depicted as being incomplete or damaged, e.g., from the process of ripping the tape, and may be unreadable. FIG. 20 shows the ripped piece of tape of FIG. 19 with the readable codes highlighted. In the FIG. 20 illustration, the machine-readable device is able to successfully read the 67 codes highlighted in green (i.e., codes 13-79). The other 11 codes have part of the code missing and are therefore assumed to be unreadable. Exemplary embodiments allow a user to assign a single or multiple digital addresses to the aggregate of machine-readable codes simultaneously or very rapidly. In the FIG. 20 illustration, all codes highlighted in green represent the aggregate of readable codes, and therefore codes 13-79 are assigned a single or multiple digital addresses. Thus, for example, scanning any one or more of codes 13-79 would provide access to the assigned digital address(es). Taking a step back, this aggregating effect provides a useful and unique capability. The user has the versatility to rip any size piece of tape, and provided this ripped piece of tape contains at least one complete unique code on the surface, the tape will allow the user access to a chosen digital address(es). If the user happens to rip a piece of tape that contains multiple unique codes, the aggregate acts as one integral code assigned to the one or more digital addresses. This gives the user the real time flexibility in creating a single, aggregated code that can have a variable perimeter (i.e., length and width). FIG. 21 shows examples of various perimeters and shapes that can be assigned to a digital address in accordance with exemplary embodiments, where FIG. 21(a) shows examples of three different pieces of CMRCT with arbitrary perimeters/shapes and FIG. 21(b) shows examples of how a code reader device, compatible with CMRCT, can assign separate and discreet digital addresses (represented by the transparent boxes and accompanying images) to the three separate pieces of CMRCT of FIG. 21(a) regardless of size or shape.

Figure 24:
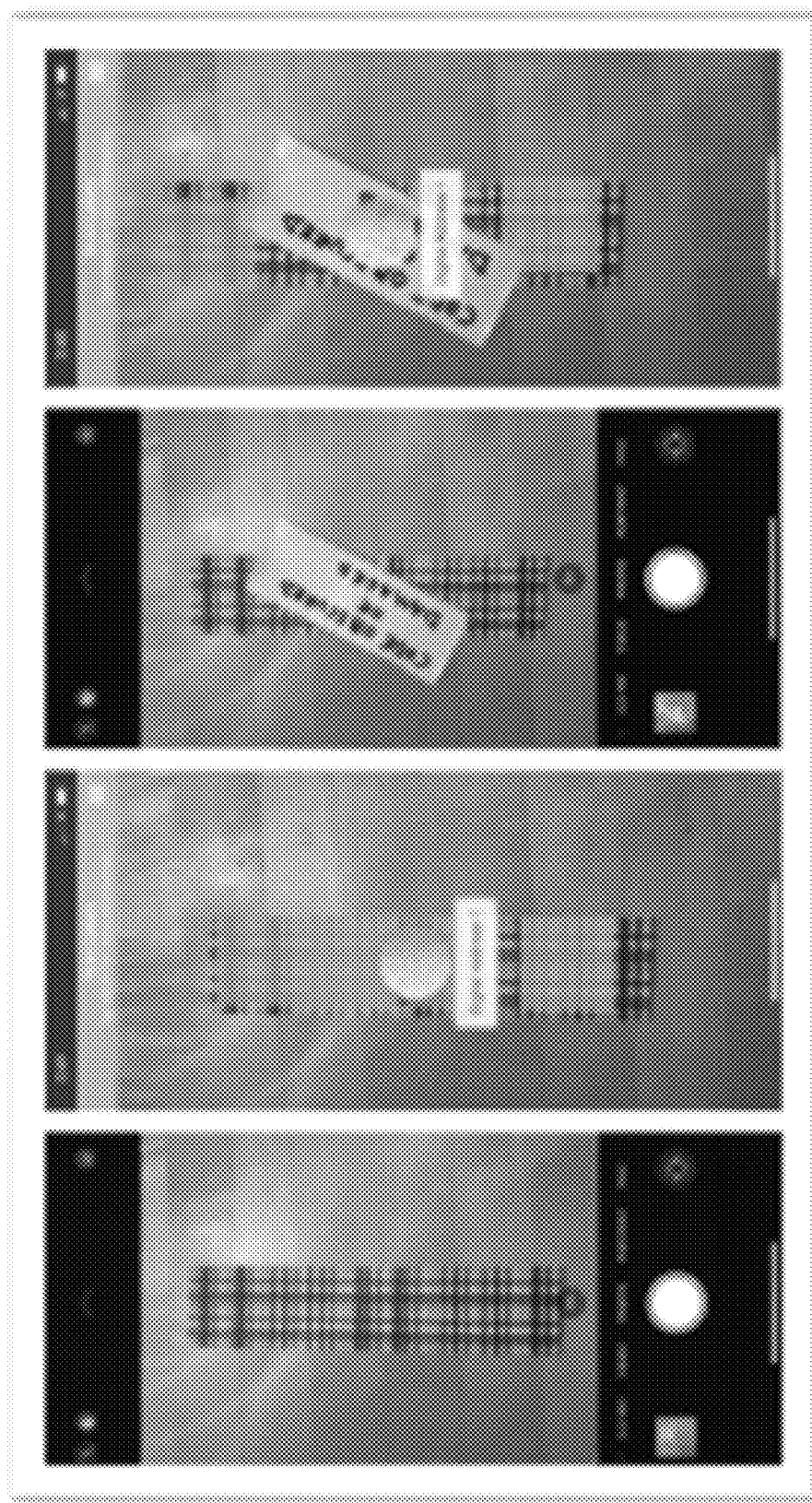
FIG. 24 is an actual screenshot of an aggregate piece of CMRCT functioning as intended even though a significant portion of the code is unobservable (or essentially damaged) as simulated by the white tape.

Digital ruggedness and reliability: There is also another advantage to this aggregate effect that makes CMRCT useful, and this is reliability. A piece of tape or fabric strip that contains two or more codes that are assigned to a digital address builds a layer of redundancy to the aggregate in question. As long as one unique code is observable and readable, that one unique code is enough for the user to access the digital content. FIG. 22 shows an example in which a portion of the ripped tape of FIG. 20 has been damaged or obscured so as to leave individual readable and non-readable codes. In this example, codes 20 through 23, 25 through 65, and 68 through 71 have been damaged or obscured such that these codes have become unreadable. However, codes 13 through 19, 24, 66-67, and 72 through 79 are still readable. If the user scans the piece of CMRCT with a code reader device that is compatible with CMRCT, these readable codes will allow the user to gain access to the digital address or addresses associated with the piece of tape. In fact, the user still has 18 redundant paths to that digital address or addresses for this particular example, even after this sizable damage. If this same circumstance would have occurred using machine readable code in its existing format, whereby the adhesive label contains one single code alone such as a barcode or QR code as shown in FIG. 23, the damage would have rendered the codes unreadable and therefore would have prevented the user from accessing the digital address(es) assigned to that code. Of note, for QR codes specifically, the most damage they can withstand is approximately 30% of the code's main body. This 30% figure is for QR codes that fall under Level H; the level with the highest damage resistance. FIG. 23 illustrates significantly more than 30% damage, which would make this QR code unreadable. FIG. 22 also shows significantly more than 30% damage, but the unique code redundancy of CMRCT makes it still readable. Taking a step back, CMRCT and the aggregate effect makes the employment process more reliable and resistant to damage or obscuration because of the redundancy built into the aggregate effect. FIG. 24 is a photograph of an actual demonstration of this digital ruggedness feature using CMRCT in accordance with one exemplary embodiment, where FIG. 24(a) is a screenshot of an undamaged piece of CMRCT, FIG. 24(b) is a screenshot of the same piece of CMRCT with unique codes aggregated and assigned to one digital address, FIG. 24(c) shows this same piece of tape now damaged/obscured as simulated by obscuring a large area of the code with white tape, and FIG. 24(d) shows that even with the damage, the code is still readable, where the transparent boxes indicate which parts of the code are still readable and therefore which parts of the code enable access to the digital address(es). Here, both ends of the aggregate piece that remain undamaged and observable are successfully read by a smart device as shown by the augmented reality squares above and below the white tape. A user can appreciate how the aggregate effect and the redundancy built into a single aggregate provides a significant amount of flexibility in less than optimal conditions.

Figure 25:
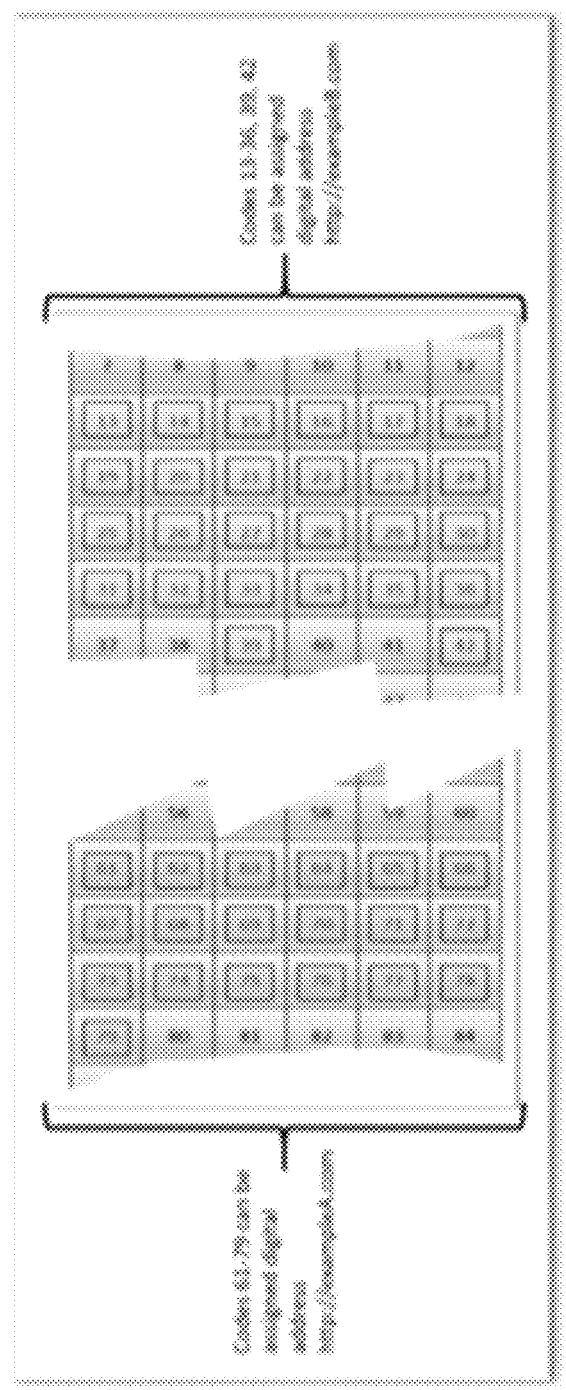
FIG. 25 is an illustration depicting how a piece of CMRCT can be spliced or torn into two separate entities and still function as intended provided each aggregate contains at least one complete code that in turn can be reprogrammed to two separate digital addresses by using the compatible software application.
Figure 26:
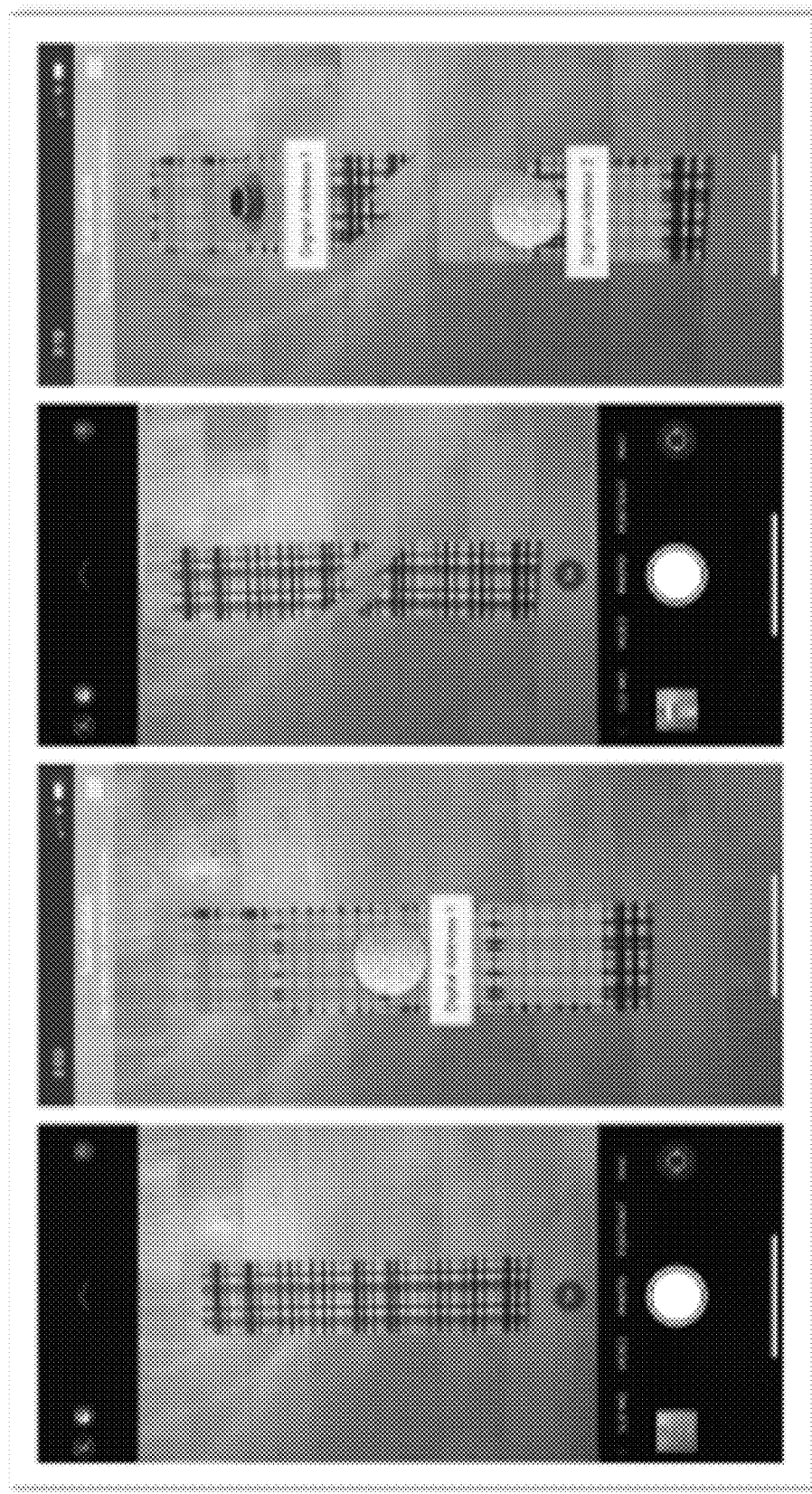
FIG. 26 is an actual screenshot of two spliced pieces of CMRCT and their respective aggregates functioning as intended and, in this example, assigned to two separate digital addresses as represented by the augmented reality imagery over each piece.

Enhanced versatility: Another advantage of CMRCT is the flexibility when it comes to creating different code sizes in real time. The collection of physically-attached and compacted codes provide many different ways to vary the size and shape of the aggregate. Furthermore, a user with compatible software can reprogram the digital addresses assigned to each aggregate. FIG. 25 shows an example of how CMRCT can still function as intended even if the code is ripped or spliced apart into two aggregates. In the FIG. 25 illustration, the user can rip the tape in half, and reprogram one piece of the tape to be assigned one particular digital address, while assigning a completely separate digital address to the other piece. Thus, in this particular example, two pieces and the respective aggregates are assigned two different digital addresses. Taking a step back, this allows a user to rip or cut a machine-readable code to many sizes or shapes and assign different digital addresses to any discreet pieces, provided each piece has at least one complete code contained within. The user can also change the digital addresses of each aggregate piece at any time. FIG. 26 demonstrates this enhanced versatility of CMRCT, where FIG. 26(a) is a screenshot of an arbitrary piece of CMRCT, FIG. 26(b) is a screenshot of the same arbitrary piece of CMRCT with codes aggregated and assigned to one digital address, FIG. 26(c) is a screenshot of this same piece of tape cut in half and divided into two irregular shaped pieces, and FIG. 26(d) is a screenshot demonstrating how these two pieces of the same tape can be reassigned to two separate and discreet digital addresses using a machine-readable device that is compatible with CMRCT.

5. Additional Features for CMRCT

The following section outlines some specific added features of CMRCT that those of ordinary skill in the art, informed by the present invention, will be able to do.

Figure 27:
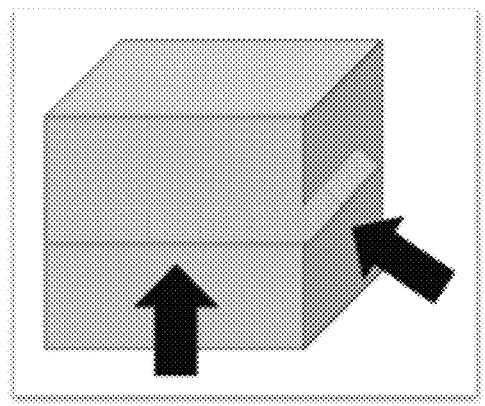
FIG. 27 is an illustration of how CMRCT and the aggregate effect is not constrained by what a machine-readable device with compatible software can view in one single frame of reference but instead the aggregate effect can occur over an unspecified amount of time and from different positions and angles of scanning, such that the machine-readable device can accumulate all the necessary codes that are intended to comprise the aggregate of CMRCT.

No scanning constraints: Embodiments of this invention, and specifically the aggregate effect, are not limited to what a code reader device can see in one frame of observation. Exemplary embodiments of the software compatible with CMRCT allow scanning continuously or in discrete frames along a length of tape. For instance, if a user has a tape wrapped around a box, which prevents seeing the entire length of tape in one frame of observation, the user can scan along the tape and around all sides to capture the individual codes and aggregate them. Additionally or alternatively, a user could also scan two locations along the length of the tape (e.g., at the beginning and end of the tape), and the software contained in the code reader device can infer the codes that lie in between, and therefore aggregate the codes as discussed herein. In order for code reader device to do this, a central database holds a library of codes in the specific order in which they are placed on the tape, such that if the software recognizes two separate codes (e.g., the two ends of a length of tape), it can infer all the codes that lie in between without having to manually scan and aggregate all of them. FIG. 27 shows an example of how a code reader device can read CMRCT at multiple angles and aggregate over a length of time and at different viewable angles to successfully aggregate the entire length of CMRCT. A code reader device can also scan both ends of the tape, and rely on a digital library's organization of codes to infer which codes are between both scanned edges. This would be a shortcut method for aggregating codes in this circumstance. Overall, the present invention is not limited to any particular way of recording or aggregating a code associated with a segment of tape or fabric strip with hook and look backing.

Double Sided Tape: Certain embodiments of CMRCT will have codes (i.e., the machine-readable pattern) on both sides of the tape, to include the side with adhesive. This will allow, for example, an individual to stick a piece of CMRCT on a transparent surface such as glass or plastic and have that code readable from both sides of the transparent surface.

Codes on CMRCT outside of the visual spectrum: Certain embodiments of CMRCT will have codes (i.e., the machine-readable pattern) on the tape that are not visible to the naked eye, and only visible to a machine-readable device with the correct detection equipment. An example of this could be an ink used with CMRCT that can only be seen with an IR camera. This will allow, for example, the subtle application of CMRCT without the code visible to the naked eye. This could be for cosmetic or covert reasons, such as military applications.

Figure 28:
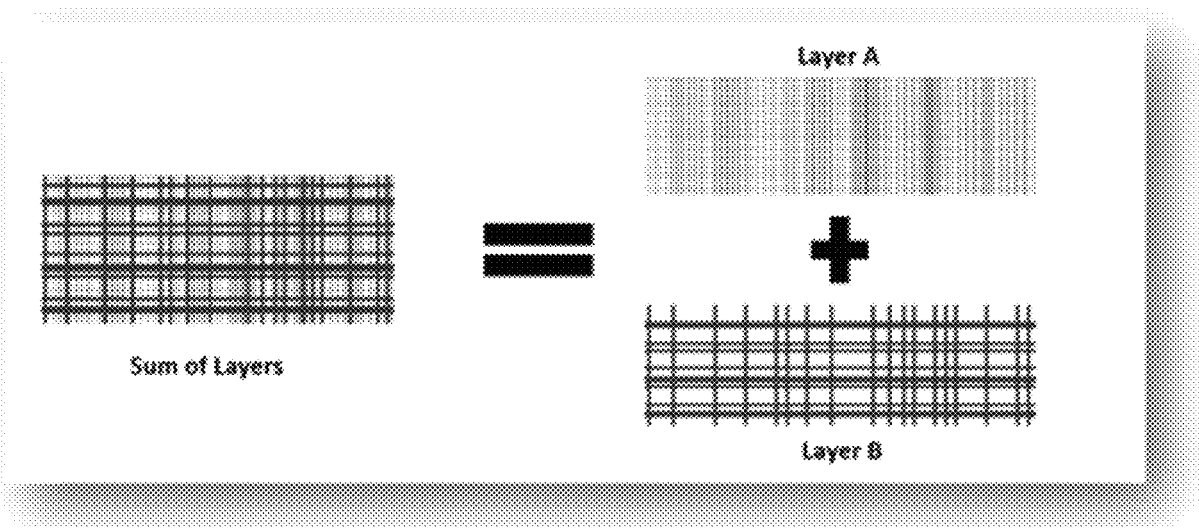
FIG. 28 shows an example of how several layers of code can overlap on a single piece of CMRCT, and a machine-readable device can differentiate between either layer of codes using various methods such as code size brackets or color spectrums.

Multilayer CMRCT capability: Certain embodiments of CMRCT can incorporate two or more layers of pattern, with each layer of pattern differentiated by certain characteristics, including but not limited to, pattern colors or pattern shapes. An example of this is CMRCT using a multi-spectral ink and multi-spectral camera setup such that a different pattern is presented in different bands of the spectrum. This allows multiple layers of machine-readable pattern to be superimposed on top of each other. This could be useful because it increases the optionality with storing digital content on a piece of CMRCT. An example of this optionality is securing user access. A single piece of CMRCT with two layers of pattern can provide one user with one type of digital content, and another user with another type of digital content. A third user could have access to both types of digital content. FIG. 28 shows an example of how two different types of codes can be layered on top of each other. In this example, the two layers of pattern are differentiated by both color (e.g., Layer A might be blue and Layer B might be red) and width. The code reader device can be configured to differentiate between both patterns and provide different digital content for each pattern, e.g., based on an identity of the user or user device. This particular embodiment functions similarly to single-layer coded patterns but using multiple layers of coded patterns.

6. CMRCT Software

Figure 29:
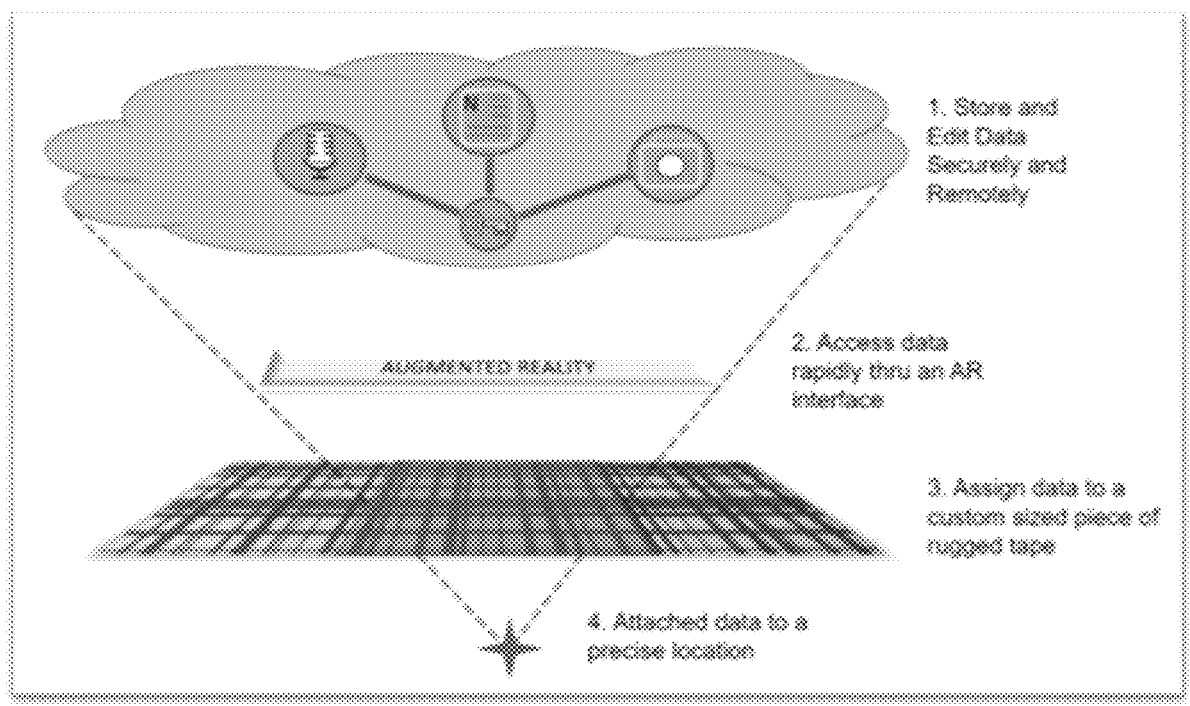
FIG. 29 is a visual depiction of how a machine-readable device with compatible software can assign data, stored in the cloud or on a local server, to a piece of CMRCT and subsequently each of the unique codes contained therein including an optional augmented reality user interface.

In exemplary embodiments, CMRCT is integrated with code reader devices. Exemplary embodiments of the present invention also include this related apparatus for scanning and processing such variable length segments and for associating information with such variable-length segments. For example, certain exemplary embodiments provide a cloud-based software solution and related "app" that allows users to scan any length of tape and assign that entire segment to point to a unique digital address or addresses where the user can store information, e.g., using the "app" on a smartphone or tablet to scan the code and storing associated information in the cloud. FIG. 29 illustrates how a code reader device compatible with CMRCT assigns cloud stored data to a piece of CMRCT, in accordance with one exemplary embodiment. Various embodiments of the "app" and cloud-based system may be implemented at least in part in any conventional computer programming language. For example, some embodiments may be implemented in a procedural programming language (e.g., "C"), or in an object-oriented programming language (e.g., "C++").

Those skilled in this area should appreciate that such computer instructions can be written in a number of programmable languages for use with many computer architectures or operating systems. Computer program logic implementing all or part of the functionality previously described herein may be executed at different times on a single processor (e.g., concurrently) or may be executed at the same or different times on multiple processors and may run under a single operating system process/thread or under different operating systems/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The activities described and claimed herein provide technological solutions to problems that arise squarely in the realm of technology. These solutions as a whole are not well-understood, routine, or conventional and in any case provide practical applications that transform and improve computers and computer routing systems.

7. Example CMRCT Use Cases

Without limitation, the following are some exemplary uses and applications for CMRCT contemplated by inventors:

Rapid information creation and exchange in rugged environments (Construction, Oil and Gas, Freight and Containers, Military Frontline Logisitics): A frontline worker can rip an arbitrary piece of tape, stick it to a precise object or location, and quickly upload digital content relating to that location or object. This can be, for example, a quick upload of a spreadsheet, a photo, a video, a voice memo, or a conversation thread. Another worker walks by, sees the tape, and quickly scans over it with a code reader device to access that information.

An example of this use case is rapid voice memos. For example, a supervisor rips a piece of tape, sticks it to a wall, scans a smart device over it and verbalizes an instruction.

The voice is captured for the piece of tape automatically. Another worker can hold a different device over the tape and hear the voice of their supervisor giving instructions pertaining to that specific location.

Another example is videos. For example, an expert records a video of how to fix a complex piece of equipment. The expert rips a piece of tape, sticks it to the exact location that pertains to the video, and uploads the video itself. Another worker who needs to fix the equipment but does not have the expertise to do so can scan over the tape, see the video, and apply the fix. That worker can also upload questions or comments on the tape through the app. An expert can remotely track the comments and answer the questions. CMRCT gives the expert a low-cost way to spread their expertise easily across a vast physical space so that they no longer have to be physically present to apply their knowledge. A worker without the necessary expertise can quickly cross reference the digital content containing the expertise and tie it to the exact location to which it belongs.

Figure 30:
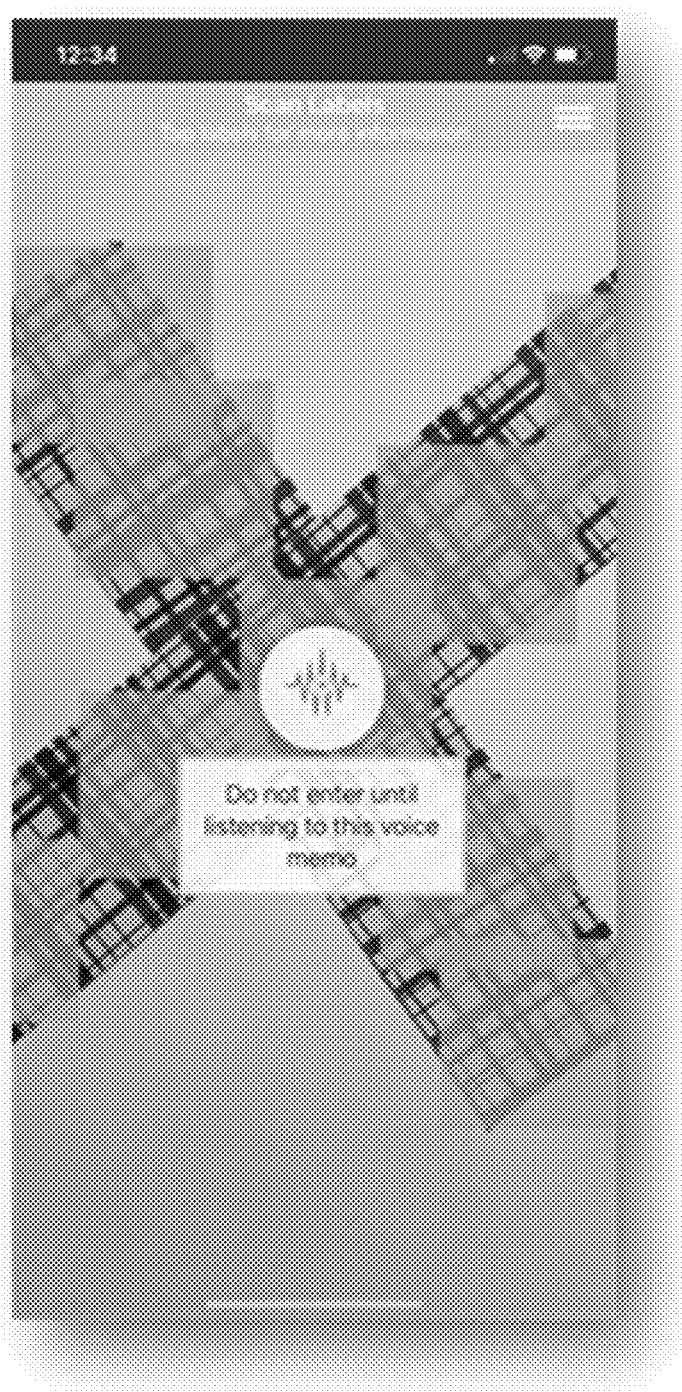
FIG. 30 is a screenshot of the software application compatible with CMRCT scanning and reading a single digital address assigned to two pieces of tape forming an 'X' to demonstrate how the aggregate effect behind CMRCT can provide a user added versatility as it relates to how the tape is used.

Another example is tracking equipment or inventory using custom-sized tape. For example, a worker can tear a small patch of CMRCT and attach it to an individual piece of equipment such as a hand drill. Any time a worker scans over the small patch of tape, the central database can track who used the tool, when and where. The same worker can use a long strip of CMRCT from the same roll to wrap around an entire box of inventory. This allows the worker to track the box in the same way as the tool, however the worker can customize the machine-readable label's size so that it is more conspicuous and can be scanned from multiple sides of the box. The same worker uses the same roll of CMRCT to tape an 'X' shape to a door that has heavy machinery behind it. This easily recognizable 'X' shape, visible to the naked eye, tells other workers that the digital content uploaded to this particular 'X' is considered high priority. In this example, a worker should not enter the room without listening to safety instructions contained in the form of a voice memo on the tape. FIG. 30 shows a screenshot of software, compatible with CMRCT, able to assign a single digital address to two pieces of tape forming an aggregate in the shape of an 'X'. This versatility allows workers to add visual cues, visible to the naked eye, on top of the digital content uploaded to the tape.

Tracking large crowds of people on secure sites (Construction, Oil and Gas, Military bases): The need to track individuals and their information as they work in secure places is important. ID badges are limited in the information they can hold and can fall off or be misplaced, and facial recognition software is expensive and has privacy concerns. CMRCT is a low cost, versatile way to attach digital content pertaining to an individual and attach it to something like a safety helmet, without the need for invasive facial recognition.

An example of this is a supervisor who must track different groups of individuals with different types of skills. For example, the supervisor can have many different rolls of CMRCT, each with different color combinations—black and white, red and white, and green and white. The supervisor decides to assign information about an individual's identify (name, qualifications, training history) to the black and white tape, the individual's safety record to the green and white tape, and the individual's record of emergency data (blood type, next of kin, allergies) to the red and white tape. The supervisor also decides that different shapes signify which department that individual belongs to. A tape in the shape of an "L" is one department, and "T" another. With the versatility that CMRCT offers, a supervisor can easily create a system to track individuals and quickly identify relevant information about them.

Another example is a task board. For example, a supervisor traditionally has a white board that tracks people on the site, what they are doing and completion times. The supervisor has a roll of CMRCT that holds individual sections of repeated code. For instance, each 6-inch segment of tape holds multiple repeated codes, but each 6-inch segment is different than any other 6-inch segment on the tape (i.e., similar to FIG. 12). In this case, the segments are clearly defined and separated on the tape. The supervisor takes a single 6-inch segment of repeated code, rips it in half, and puts one half on the board and the other half on the individual's helmet. Because this section of the tape uses repeated (i.e. similar) code, it means scanning the tape on the board and scanning the tape on the helmet allows the user to access the same digital address linked to both pieces of tape. This process is similar to a raffle ticket whereby a single ticket gets ripped in half and each half contains the same number. The supervisor has now added a digital layer to a simple white board using a roll of CMRCT. The user with the helmet can quickly scan their helmet and provide updates through voice or photographs. The supervisor can quickly scan over the same tape on the board and receive those updates.

Tracking Medical Patients as they are transferred from one layer of care to another: In time sensitive situations, the ability to transfer information about a patient from one form of care to another is paramount. Time can be the difference between life and death. CMRCT on an adhesive tape (e.g., surgical or wound closure tape) or on a fabric strip with hook and loop backing is a quick way to attach digital content to a patient. A medical facility can have 100s of these fabric strips at low cost, with each of the fabric strips fully aggregated and assigned to a unique digital address, such that a user can scan any segment of the strip (i.e., any individual code on the strip) and rapidly access the digital content assigned to it.

An example is a first responder. They treat the patient at the site of injury. After treatment, they attach a CMRCT fabric strip to the patient's arm and secure it using the hook and loop. They scan any part of the strip with a machine-readable device to quickly access its relevant file. Once the scan is complete, they can quickly add information about the patient such as voice memo detailing treatment given. The next layer of care can access that voice memo remotely on the database so they are better prepared when the patient arrives. As soon as the patient arrives, they can scan any part of the fabric strip attached to the patient to confirm the patient and access any other digital information pertaining to the patient.

Consumer uses CMRCT to track their storage: Since CMRCT uses adhesive tape, it can be compatible with packing tape, such that the same tape used to secure boxes containing belongings can also be used to track the contents.

An example is a moving situation. For example, the user packs the box and takes photos of the contents. They secure the box with CMRCT tape and scan each end of the tape. Since the CMRCT central database holds and organizes all of the machine-readable codes (i.e., patterns) in the order in which they are presented on the tape, the compatible software can infer all the codes that lie in between the edges scanned by the user. By simple scanning the edges of the tape, the user quickly aggregates all the individual codes on the tape and assigns them to a common digital address. Once the scan is complete, the user can upload the photograph of the contents to the tape on the box, or leave a voice memo giving movers instructions on how to handle the box. The consumer can update or see the contents of this tape at any time by looking it up on a digital library. Movers can also easily add content to the tape such as updates for the consumer. Often, moving boxes get stacked on top of each other. A regular QR code or barcode label might not be easily observable if, for instance, the side with the label is up against another box. However, since CMRCT can be different sizes (i.e., lengths), the label can stretch around many different sides of the box, similar to how packing tape is commonly used. This means a user can scan any part of the tape and access the relevant digital content.

In another example, a user needs to find an object in a box. For example, the user looks up the object in the digital library, finds the box it is assigned to, and highlights the augmented reality image seen if the CMRCT tape is scanned. This highlight could be a red 'X' that is unique to the box in question. The user then goes to the storage space and scans the boxes. Since CMRCT is versatile in size (i.e., length), the coded tape can wrap around multiple sides of the boxes and thus increase the chances of being easily observed. The user rapidly scans any observable part of the tape on each box, looking for the red 'X'. Once they see it, they know that the box in question contains the item.

An individual uses CMRCT to add a layer of security to a physical location or an asset: A user can tape a piece of CMRCT to a location or an asset and upload a passcode required to gain full access to that relevant location or asset. A simple scan of the CMRCT reveals the passcode. The user can restrict access to the digital content on the tape, however, such that only individuals with the right permissions can access that content. This can be in the form of biometrics native to many machine-readable devices (e.g., smartphones). A user must have the correct thumbprint or facial scan to see the digital content on the tape through an app that is compatible with CMRCT. Since this layer of biometric security is effectively transferred to the tape, the tape becomes a low-cost mechanism to add this layer of security to almost anything.

Other exemplary uses cases of CMRCT: Without limitation, the following is a list of some further exemplary use cases of CMRCT. Since many of the advantages are similar to the ones listed above, these use cases are shortened.

Inventory and supply chains can augment their barcode system with an ad hoc one, giving users a quick and accessible way to make their own machine-readable codes by ripping a piece of tape and tracking them using ubiquitous smart devices. CMRCT fills the last mile in the barcode system whereby most users don't have access to barcode scanners or barcode label makers, but the majority of users could have access to tape and a smart device.

Security can use a piece of CMRCT as a low cost 911 call center, whereby a quick scan of the tape adds a user identity and accurate geolocation coupled with the 911 call.

Military covert operations: The military can use CMRCT as a covert way to exchange information using the added feature of machine-readable pattern printed in the infrared spectrum.

Commercial shipping fulfillment centers can use CMRCT on shipping boxes as a quick way to advertise promotions and track user engagement.

Computer guidance: CMRCT can be used to help computer scanners for robots, airborne or ground vehicles, or portable machines. The CMRCT can augment the ability for these machines to navigate the 3D space by scanning and tracking the relative position of pieces of CMRCT stuck to precise and known locations.

Augmented Reality Anchoring: CMRCT can help mitigate augmented reality drift by providing such systems a static and precise point of reference in the form of a piece of CMRCT stuck to a specific location. CMRCT is low cost and can stick to almost any surface, especially in a duct tape form factor, so it is an optimal solution for anchoring augmented reality.

Custom Personalization: Since the CMRCT process can technically use any form of machine-readable code, it allows users to customize the code inside each continuous cell such that users can, for instance, brand their CMRCT with company or personal logos.

Consumer uses a CMRCT fabric strip to add a digital layer to a suitcase tag.

Consumer uses a piece of CMRCT to add a digital layer to a paper advertisement (e.g., a video).

Consumer uses a piece of CMRCT as a digital version of a sticky note.

Consumers use CMRCT as a way to securely encode messages to one another.

Consumer uses CMRCT to add a digital layer to a messaging board on an office or dormitory door.

It should be noted that embodiments of the present invention are not limited to barcodes, QR codes, or the like, but instead can include other types of encodings including, for example, patterns incorporating strips oriented in one or more directions (such as, for example, associated with the warp and/or weft of a fabric) encoding information based on characteristics of the strips (e.g., the relative widths, lengths, and/or positions of the strips, which can be linear or non-linear such as circular strips), or a pattern incorporated into a representational aesthetic environment (e.g., depicted as plants or grasses or other aesthetic elements that hide the fact that an encoded pattern is present. Such patterns are described in various patent applications filed by Advanced Functional Fabrics of America (AFFOA), including PCT Patent Application No. PCT/US2019/026549 filed Apr. 9, 2019; U.S. Provisional Patent Application No. 62/682,975 entitled Uniquely Identifiable Articles of Fabric Configured for Data Communication filed on Jun. 10, 2018; U.S. Provisional Patent Application No. 62/743,913 entitled Uniquely Identifiable Articles of Fabric Configured for Data Communication filed on Oct. 10, 2018; U.S. Provisional Patent Application No. 62/781,437 entitled Uniquely Identifiable Articles of Fabric Configured for Data Communication filed Dec. 18, 2018; PCT Patent Application No. PCT/US2018/012193 filed Jan. 3, 2018; U.S. Provisional Patent Application No. 62/442,283 filed Jan. 4, 2017; and U.S. Provisional Patent Application No. 62/521,150 filed Jun. 16, 2017, each of which is hereby incorporated herein by reference in its entirety. Thus, embodiments can incorporate AFFOA's so-called LOOKS™ technologies into the tape, "app," and/or cloud-based system. The presence of many of these types of machine-readable codes, as well as certain other types of codes, may not be discernible by a human. For example, codes on the tape may appear as plaid patterns, random patterns, camouflage patterns, multi-color patterns, aesthetic patterns, etc.

In certain exemplary embodiments, the pattern looks like plaid made of two or more colors, e.g., one or more foreground colors (the 'lines') and one background color. It is composed of x-lines that run the entire length of the tape, and orthogonal y-lines that run the entire width of the tape. Usually, but not always, there are an equal number of x-lines and y-lines in any given cell, therefore the total number of y-lines is much greater than the total number x-lines. The x-lines can have varying widths and are not necessarily distributed evenly across the tape width. The y-lines can have varying widths and are not necessarily distributed evenly along the tape length. The x-lines in each cell are identical and positioned in the exact same location in each cell and so appear to run continuously through the length of the tape. The y-lines are uniquely positioned along the x-dimension of each cell, therefore making each cell unique.

Together, this unique plaid code pattern and companion software allow for a higher distance readability on a smartphone versus existing QR and barcode solutions. For example, in an exemplary embodiment, it is expected that a square cell of this pattern can be read from a distance of about 20× the square's length using no optical zoom function. For example, in an exemplary embodiment, a 5 cm×5 cm square can be read from a distance of 1 m. In comparison, regular QR codes can be read from only about 10× the code's length, making the described solutions $2x$ better in distance reading.

It should be noted that there may be a predetermined minimum segment length in order to identify a unique code, e.g., the tape may begin a new code every X inches on the tape (e.g., every 10 inches). In such embodiments, the user would have to tear off a segment of at least the minimum length. The tape can be marked (e.g., printed) every X inches so that the user can identify the start and end of codes. The marking could include a company's logo or brand, which would help the company expose their brand.

Figure 31:
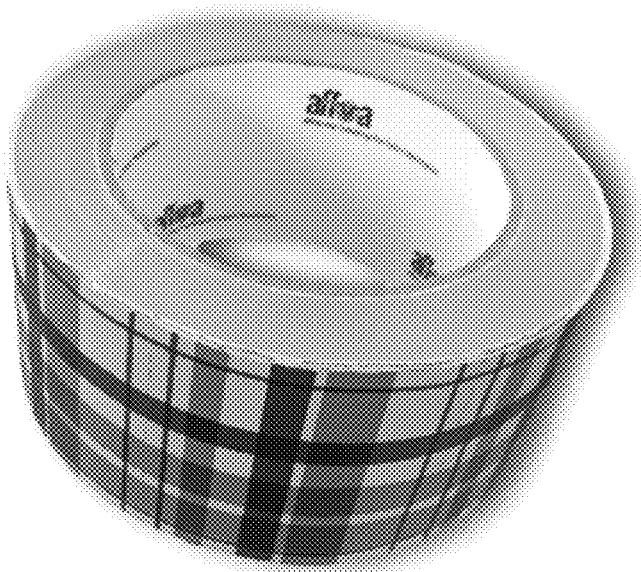
FIG. 31 shows a roll of tape including successive cells with unique plaid codes, in accordance with one exemplary embodiment.
Figure 32:
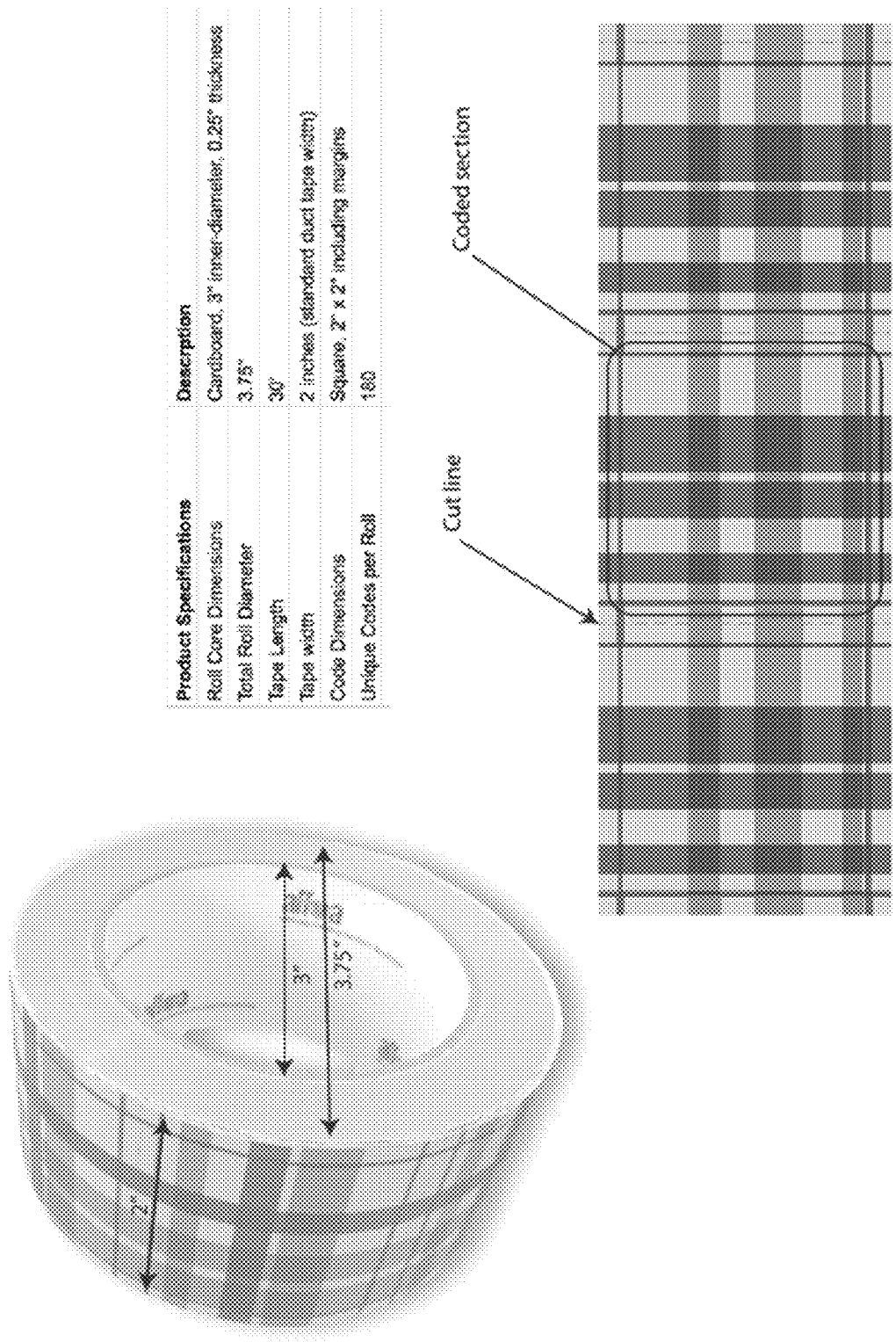
FIG. 32 shows additional details of the exemplary tape of FIG. 1 including demarcations between adjacent cells (coded sections) that may be printed on the tape, e.g., in the form of designated cut lines between adjacent cells.

FIG. 31 shows a roll of tape including successive cells with unique plaid codes, in accordance with one exemplary embodiment. Each cell can be uniquely coded, for example, by varying the width/thickness of one or more vertical bars, the distance between two or more vertical bars, the width/thickness of one or more horizontal bars, the distance between two or more horizontal bars, and/or the color of one or more bars. FIG. 32 shows additional details of the exemplary tape of FIG. 31 including demarcations between adjacent cells (coded sections) that may be printed on the tape, e.g., in the form of designated cut lines between adjacent cells.

Figure 39:
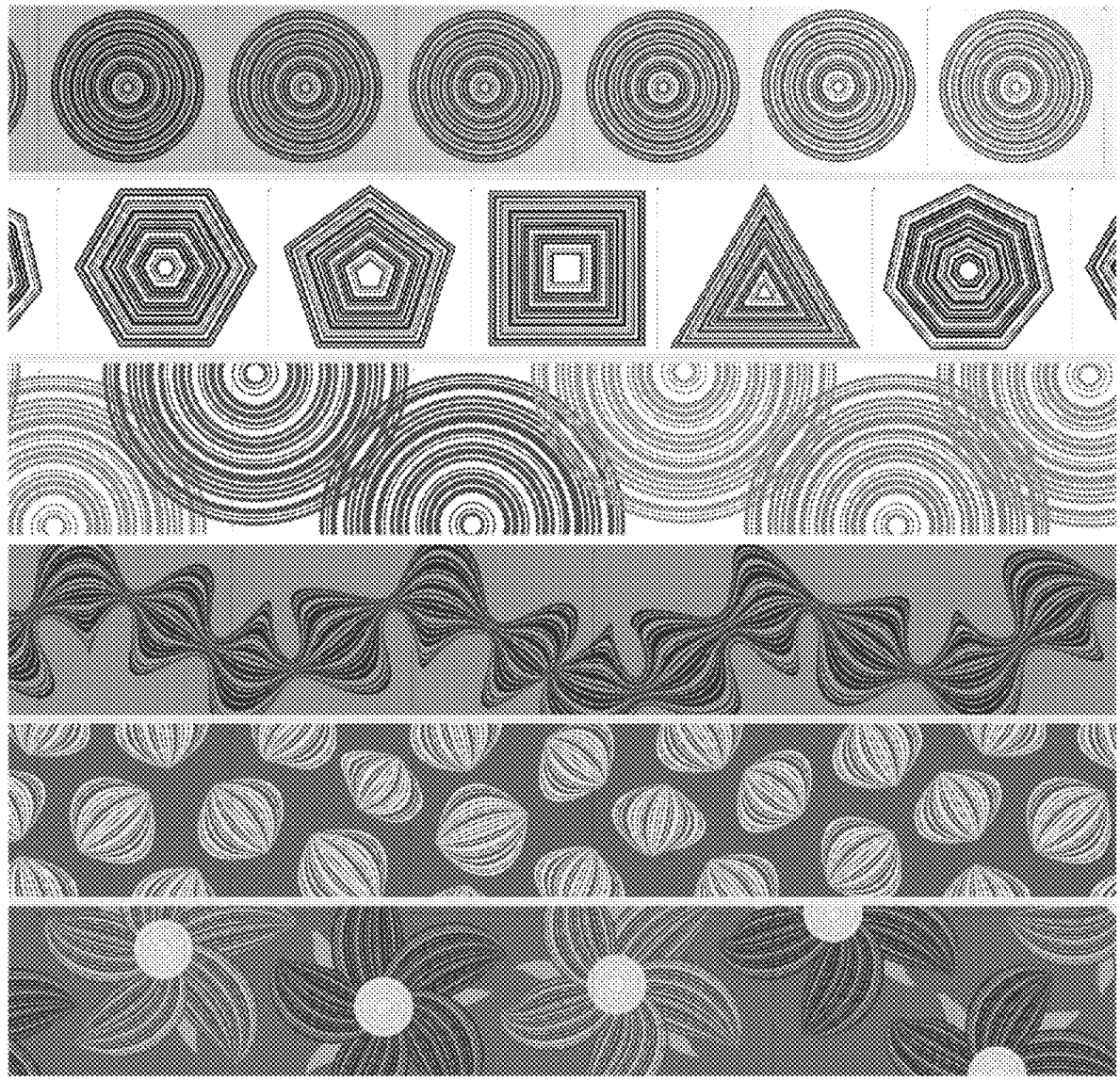
FIG. 39 shows some exemplary encoded custom patterns, in accordance with various exemplary embodiments.

As discussed above, tapes can be encoded using aesthetically pleasing patterns. FIG. 39 shows some exemplary encoded custom patterns, in accordance with various exemplary embodiments. The exemplary patterns shown in FIG. 39 show demarcation locations between adjacent codes/cells that, again, may be printed on the tape. Each cell can be uniquely coded by varying the patterns, e.g., the width, thickness, and/or position of rings in the top pattern or flower petal details in the bottom pattern.

Figure 40:
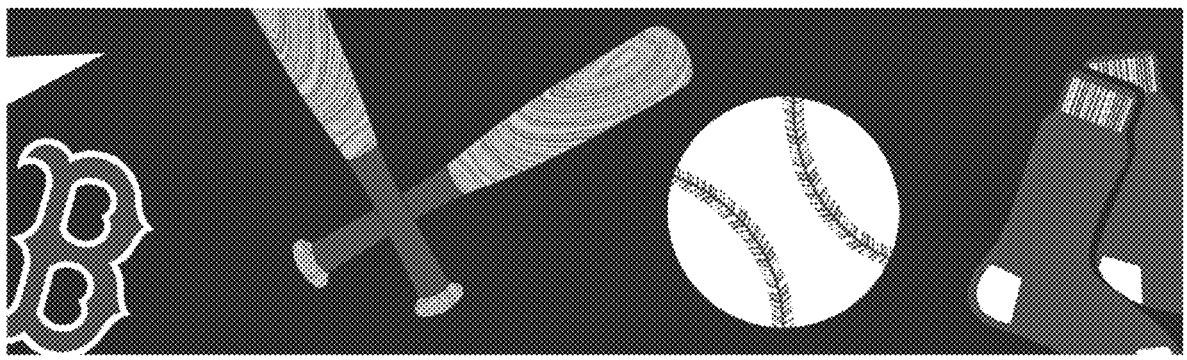
FIG. 40 shows a branded tape, in accordance with one exemplary embodiment.

FIG. 40 shows a branded tape, in accordance with one exemplary embodiment. Here, encodings can be varied, for example, by varying details of the "B," varying the woodgrain details in the baseball bats, varying seam details on the baseball, varying details on the band of the socks, varying the positions/orientations of the various elements, and/or varying other details (e.g., the length of the baseball bat grips). One, two, three, or all four of the elements shown may encompass a single code, e.g., the "B", the bats, the ball, and the socks may be separate codes, or all four together may be a single code.

Figure 33:
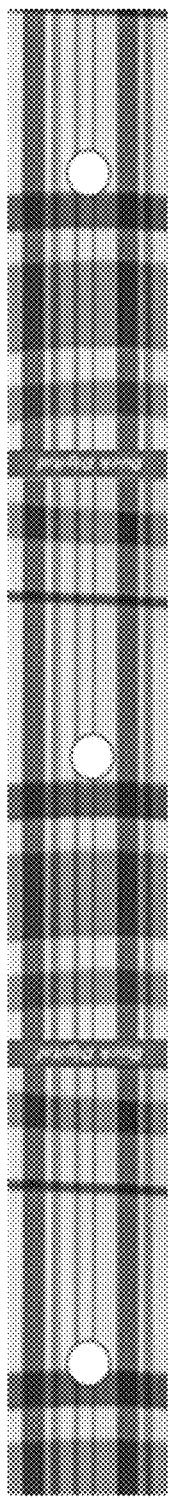
FIG. 33 shows a section of tape including portions of three adjacent codes separated by demarcations and including anchor marks, in accordance with one exemplary embodiment.
Figure 34:
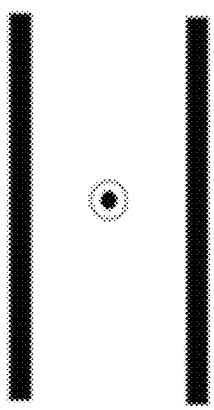
FIG. 34 shows an example of a centering mark and border lines, in accordance with one exemplary embodiment.

It should be noted that the tape can include anchor marks (e.g., a circle or "bullseye" mark) and/or other demarcations denoting locations of codes on the tape, which could help the user in removing a sufficient amount of tape to ensure that a removed section of tape includes at least one scannable code (e.g., if a section of tape includes at least two anchor marks or other demarcations then the user may be reasonably certain that the removed section of tape includes at least one scannable code). Such anchor marks and/or other demarcations also can help the scanner (e.g., "app") identify, focus, and capture a code. FIG. 33 shows a section of tape including portions of three adjacent codes separated by demarcations and including anchor marks, in accordance with one exemplary embodiment When the user is using an "app" to capture an image of the code, the "app" might provide a centering mark on the camera screen that the user moves onto one of the anchoring marks and adjusts the camera distance so that the tape/code is within predetermined border lines on the camera screen. FIG. 34 shows an example of a centering mark and border lines, in accordance with one exemplary embodiment.

Figure 35:
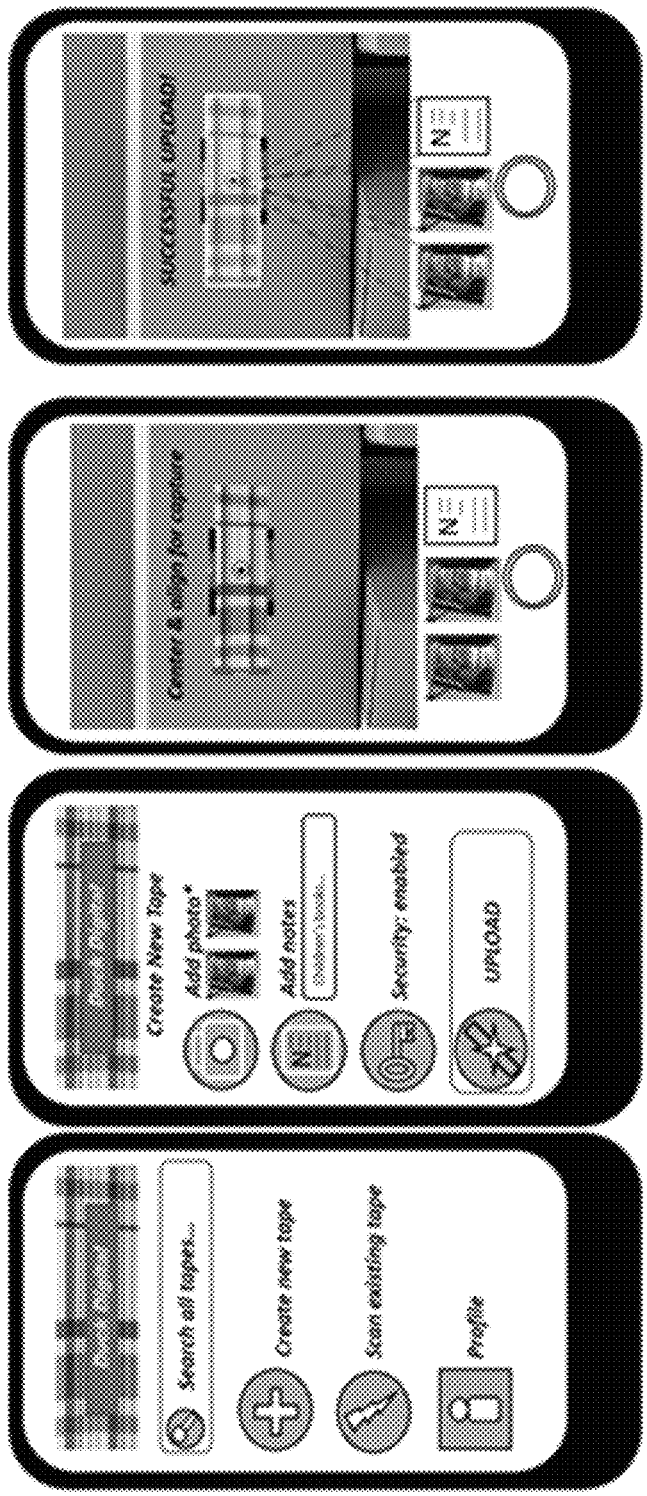
FIG. 35 shows some exemplary user interface screens in accordance with one exemplary embodiment.

When the user successfully captures an image of the code, the user can use the "app" to provide digital information for storage associated with the code. FIG. 35 shows some exemplary user interface screens in accordance with one exemplary embodiment. Here, FIG. 35(a) shows a main menu of options for the user. Specifically, the user can choose to search for tapes (e.g., when viewing a scene via the device's camera, the app may locate all encoded tapes in the scene and may display information about each identified tape for which information is stored/available), create a new tape (e.g., store information for a new piece of encoded tape), scan an existing tape (e.g., focus the camera on a piece of tape in order to obtain information about that piece of tape), and edit profile information. Assuming the user chooses to create a new tape from the screen in FIG. 35(a), a "create new tape" screen as shown in FIG. 35(b) is presented in order to allow the user to add information for the new piece of tape including such things as a photo, notes, a security setting, and an uploaded file. After adding information for the new piece of tape, the user can capture an image of one or more codes on the piece of tape from the screen shown in FIG. 35(c), e.g., by navigating the phone so that a centering mark presented by the app overlays an anchor mark of a code on the tape. Once the code (or codes) is captured, the information entered by the user is associated with the code(s) as represented in FIG. 35(d).

Figure 36:
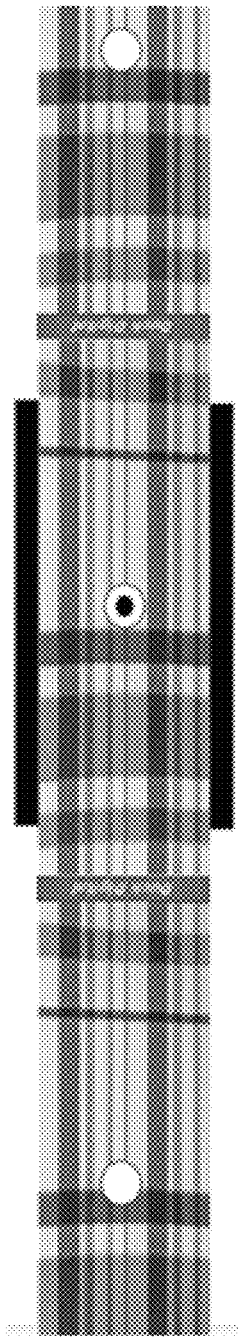
FIG. 36 shows a physically marked location on the tape, in accordance with one exemplary embodiment.

The user could physically mark the location on the tape that was used, e.g., by writing with pen on the anchor mark. FIG. 36 shows a physically marked location on the tape, in accordance with one exemplary embodiment.

Figure 37A:
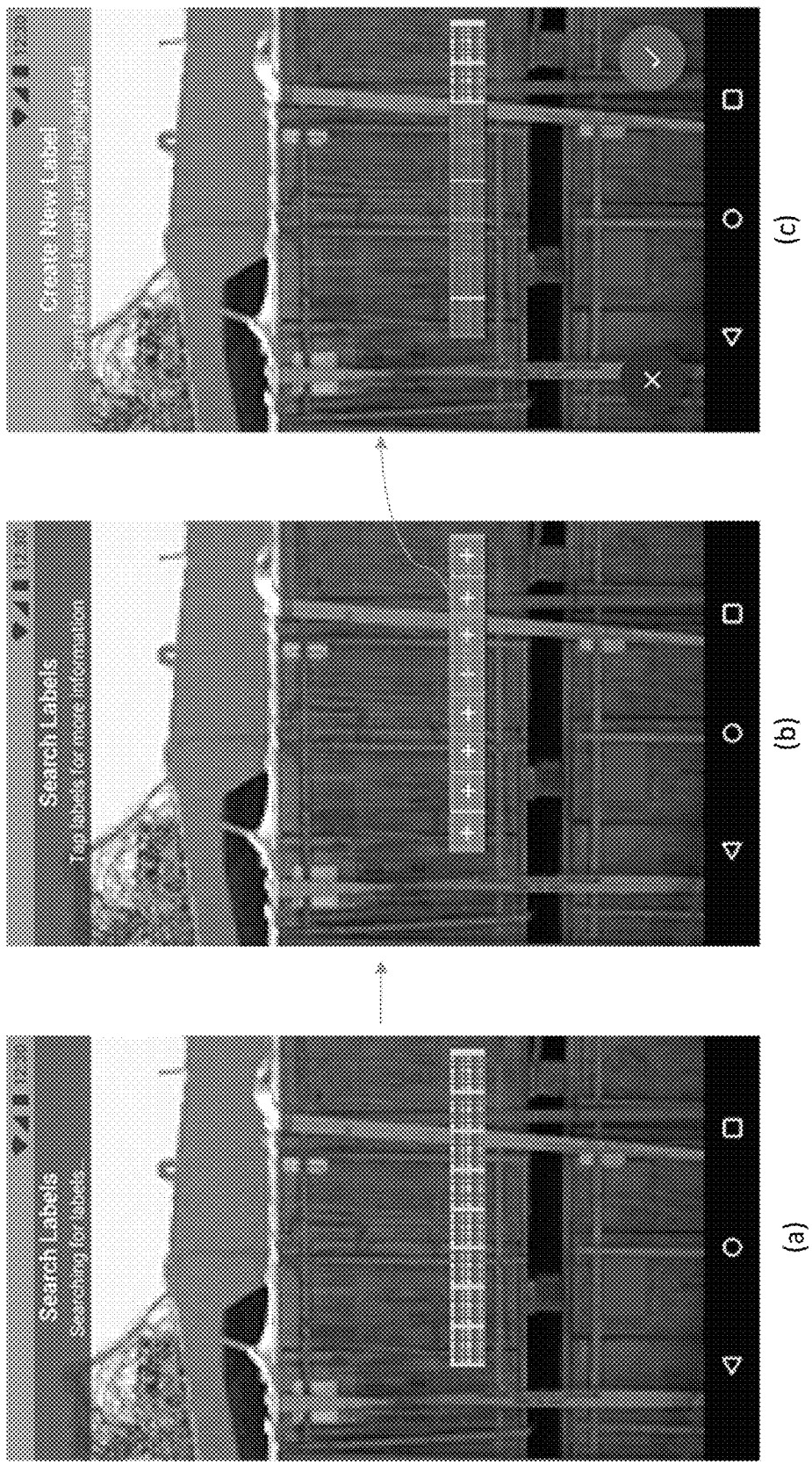
FIG. 37 consisting of partial views labeled as FIGS. 37A-37E across multiple drawing sheets and intended to form a single complete view shows a first example process flow and user interface screens for capturing one or more codes and associating information with the captured code(s), in accordance with one exemplary embodiment.
Figure 37B:
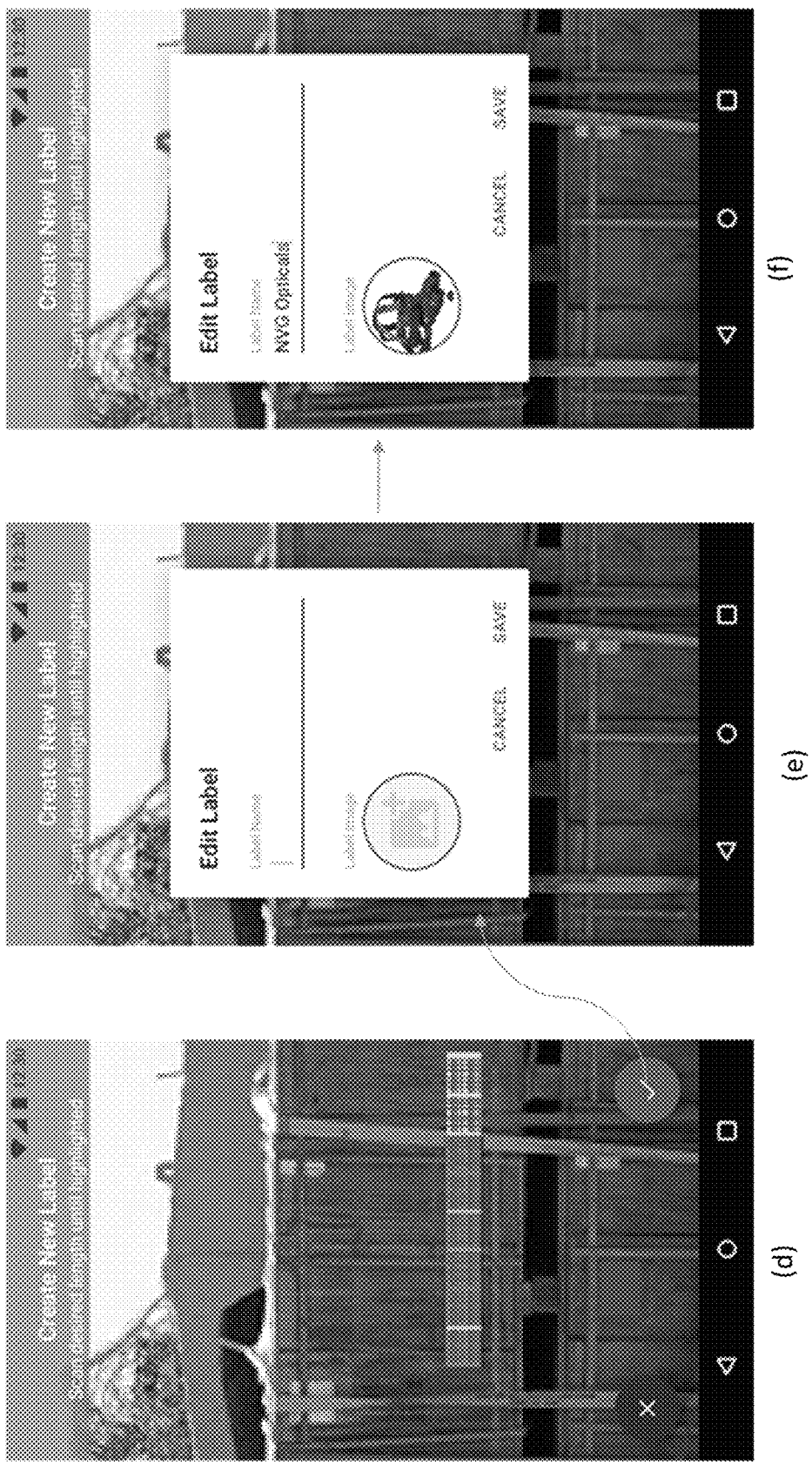
Figure 37C:
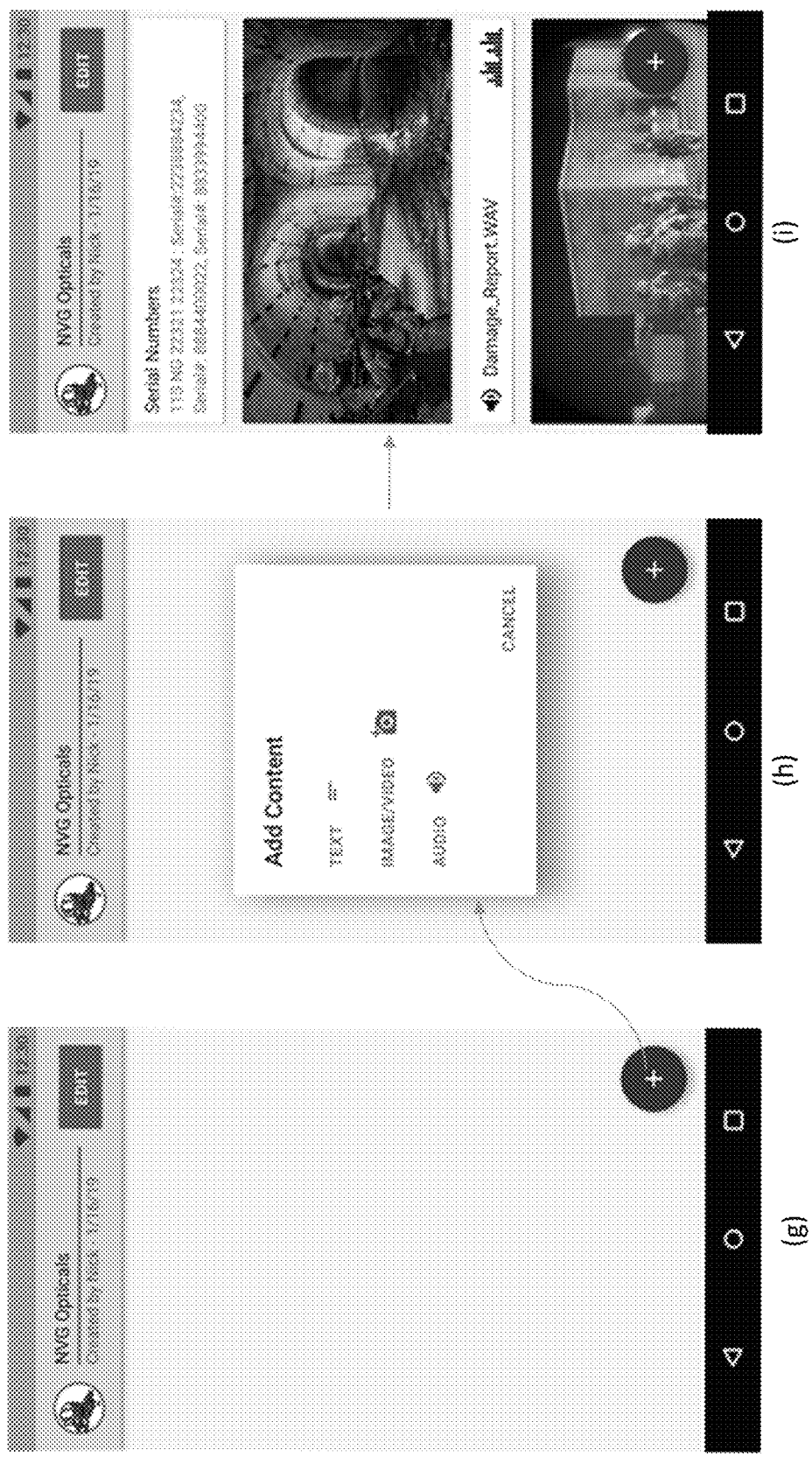
Figure 37D:
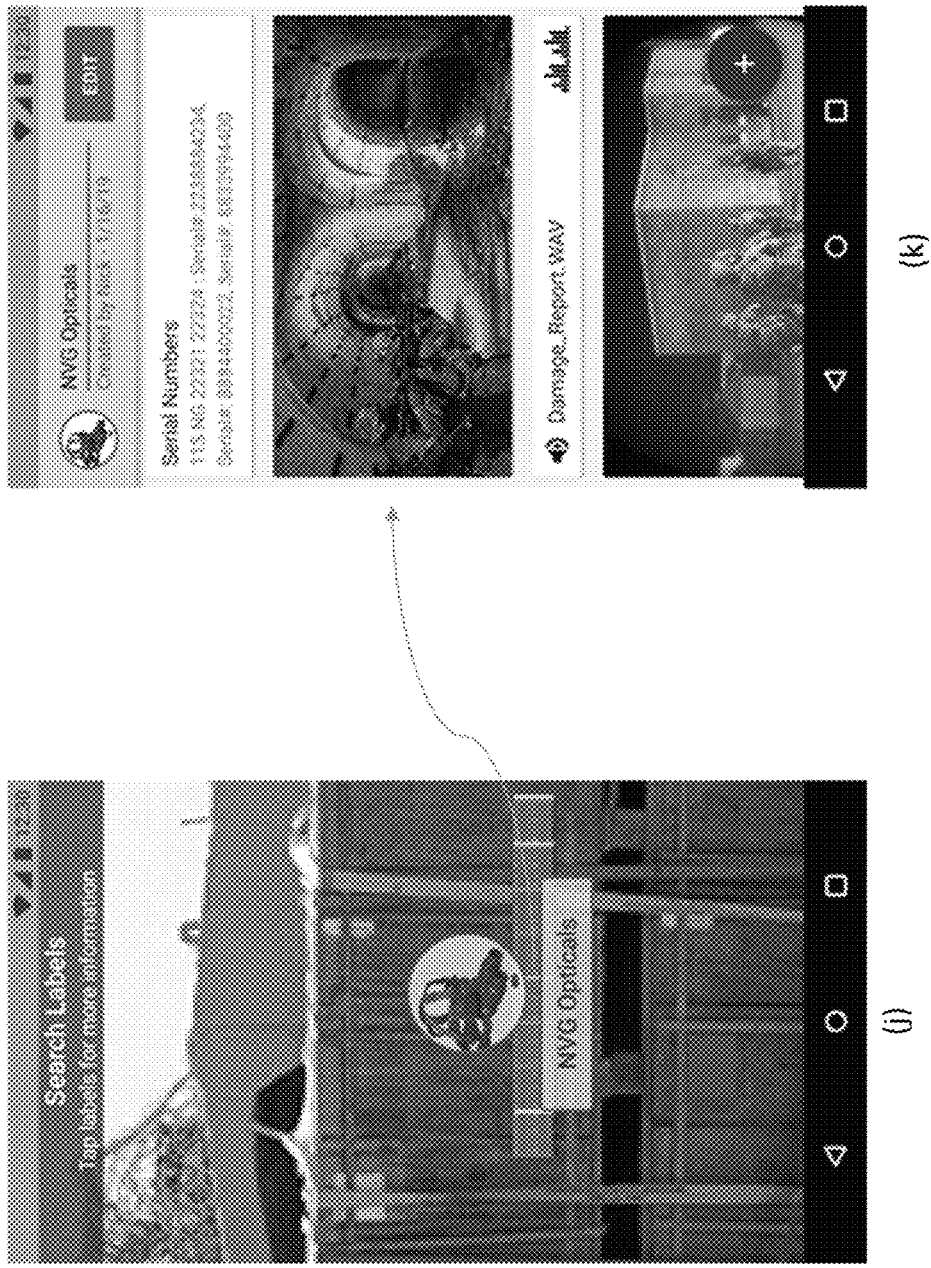
Figure 37E:
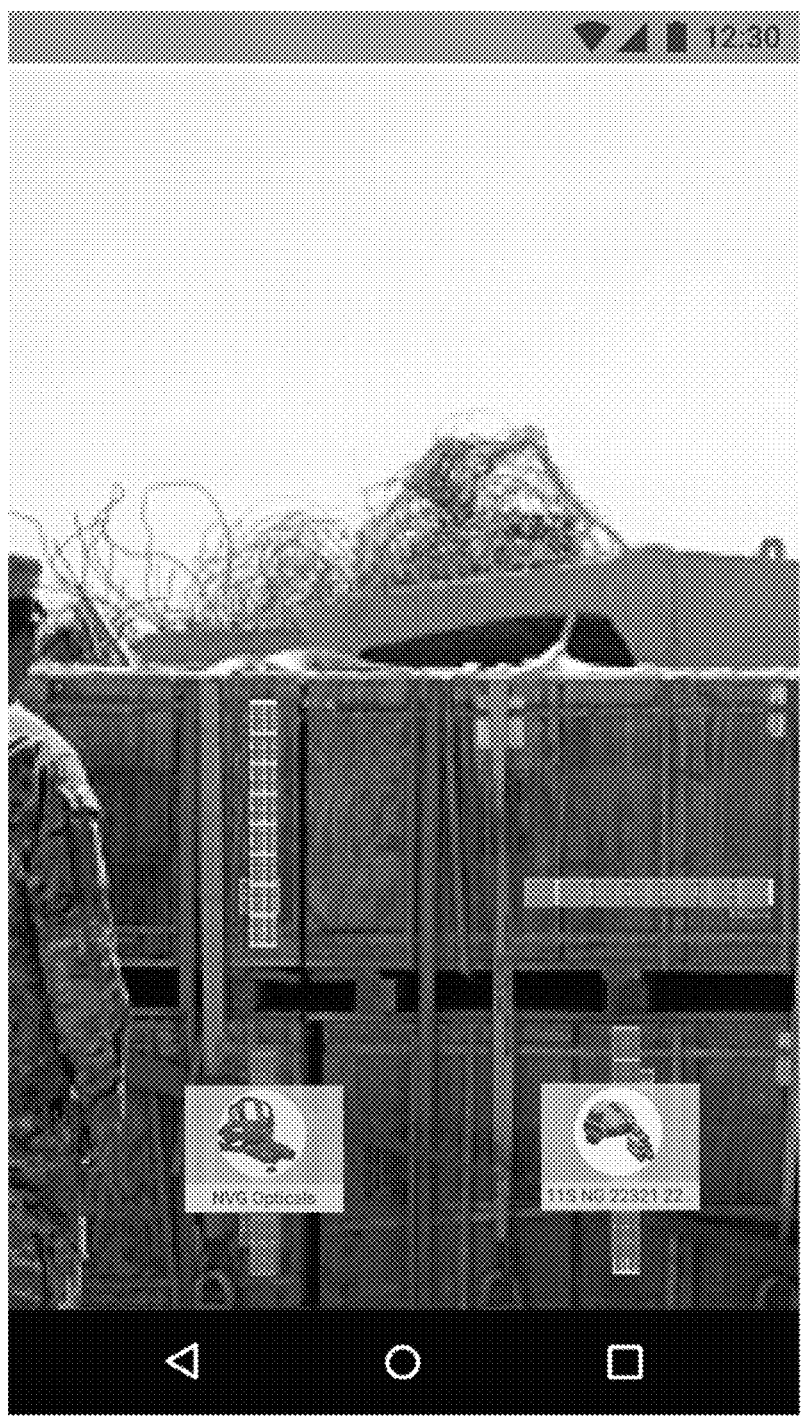

One exemplary process flow for capturing one or more codes and associating information with the captured code(s) is now described with reference to the various graphical user interface screens shown in FIG. 37. FIG. 37(a) shows a screen in which the app is searching in a captured image for one or more codes (referred to here as a "label"). FIG. 37(b) shows a screen in which a detected label is highlighted such that the user can select the label (e.g., by "tapping" on it) in order to obtain information and options regarding the label. FIG. 37(c) shows a screen that is displayed after the user taps on the label in FIG. 37(b). From this screen, the user can scan a desired length of the label and create a new label record. FIG. 37(d) shows a representation of the screen of FIG. 37(c) with the user selecting the accept (i.e., checkmark) button in order to navigate to the "Edit Label" screen as shown in FIG. 37(e). From this screen, the user can enter a label name and upload an image corresponding to the label, for example, as shown in FIG. 37(f). When the user saves the label name and uploaded image in FIG. 37(f), the user is presented with a label-specific screen from which the user can edit and add information for the label, as shown in FIG. 37(g). When the user selects the "add content" (i.e., plus sign) button, the user is presented with an "add content" screen as shown in FIG. 37(h). From this screen, the user can add text, image, video, and/or audio content for the label, for example, as represented in FIG. 37(i). After saving the added content, the label name, label image, and label content can be accessed any time the label is scanned. For example, FIG. 37(j) shows a screen in which the label is scanned, at which time the label name and label image is displayed. The user can tap on the display in order to access additional content such as any text, image, video, or audio content, as represented in FIG. 37(k). FIG. 37(l) shows a screen in which multiple labels are within a captured image, with relevant information shown for two of labels and one of the labels highlighted so that the user can tap on the highlighted label in order to create a label record for the label.

Figure 38A:
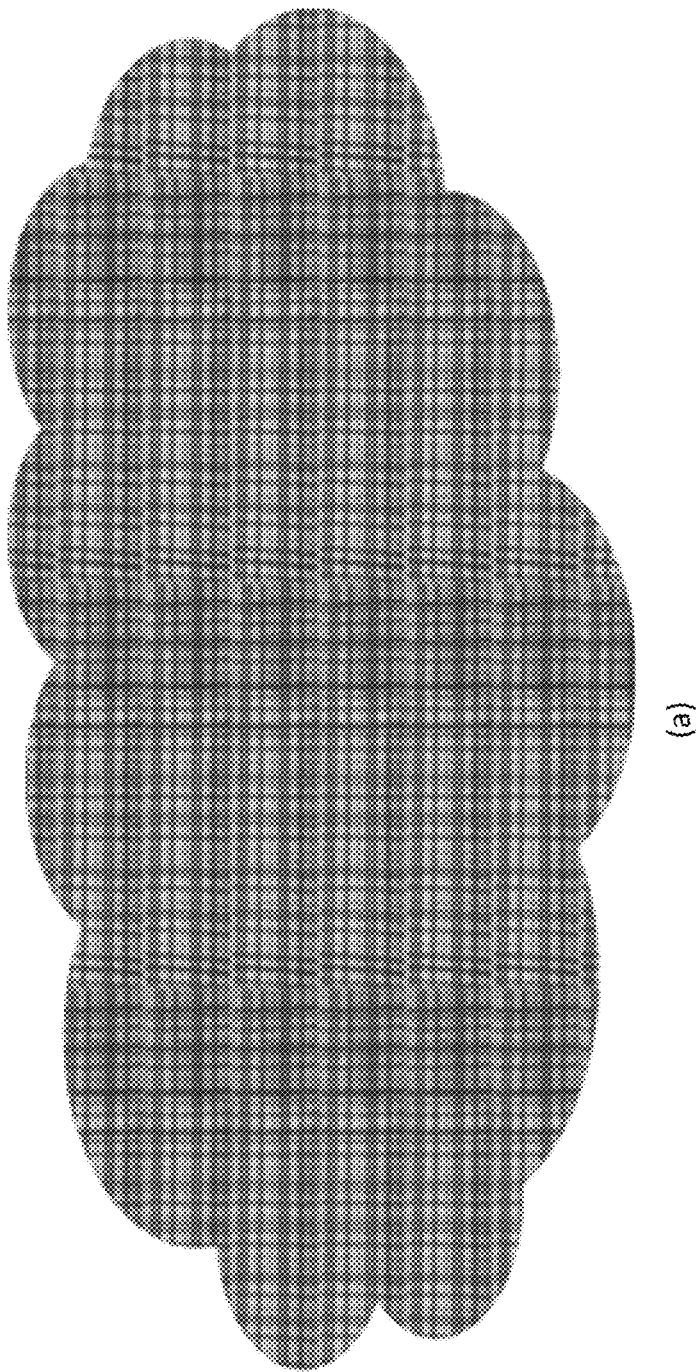
FIG. 38 consisting of partial views labeled as FIGS. 38A-38D across multiple drawing sheets and intended to form a single complete view shows a second example process flow and user interface screens for capturing one or more codes and associating information with the captured code(s), in accordance with one exemplary embodiment.
Figure 38B:
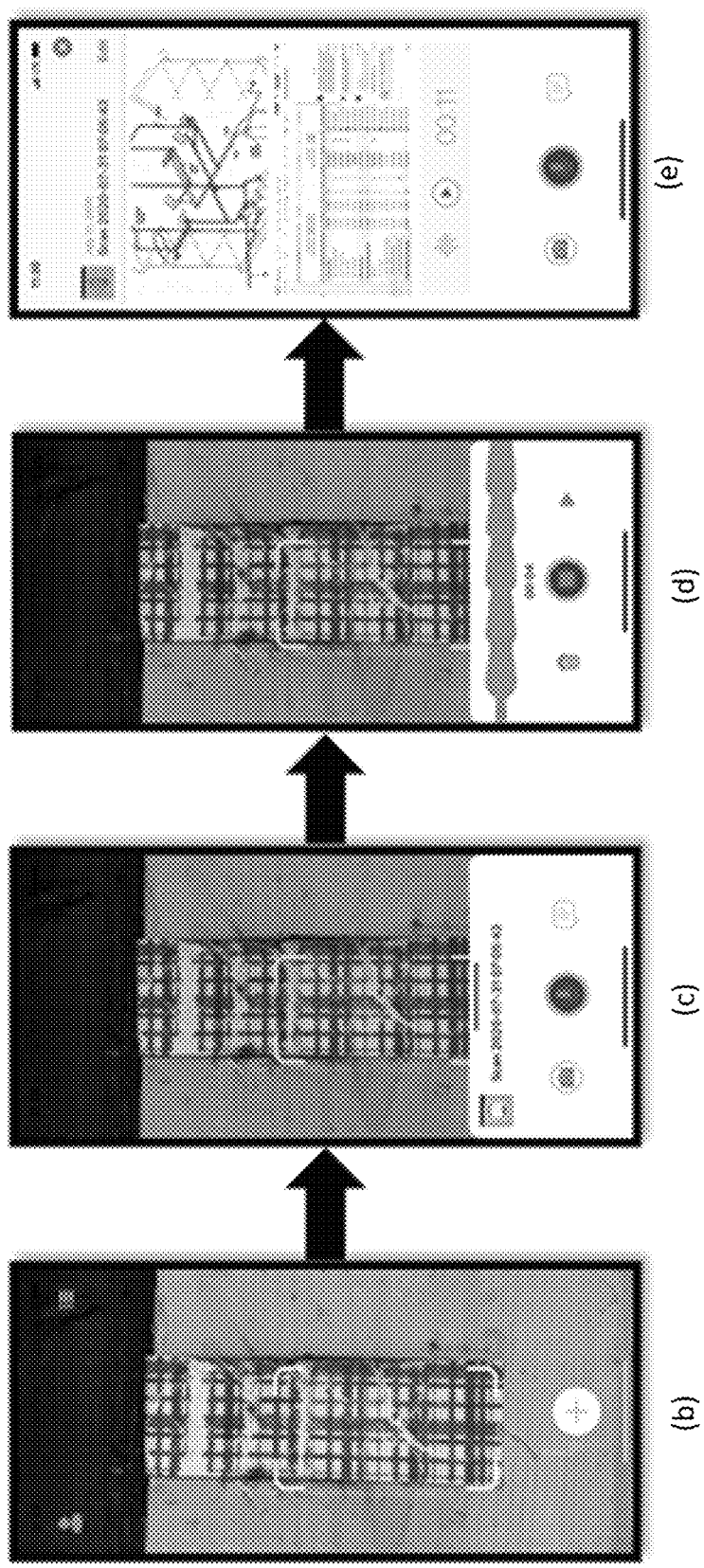
Figure 38C:
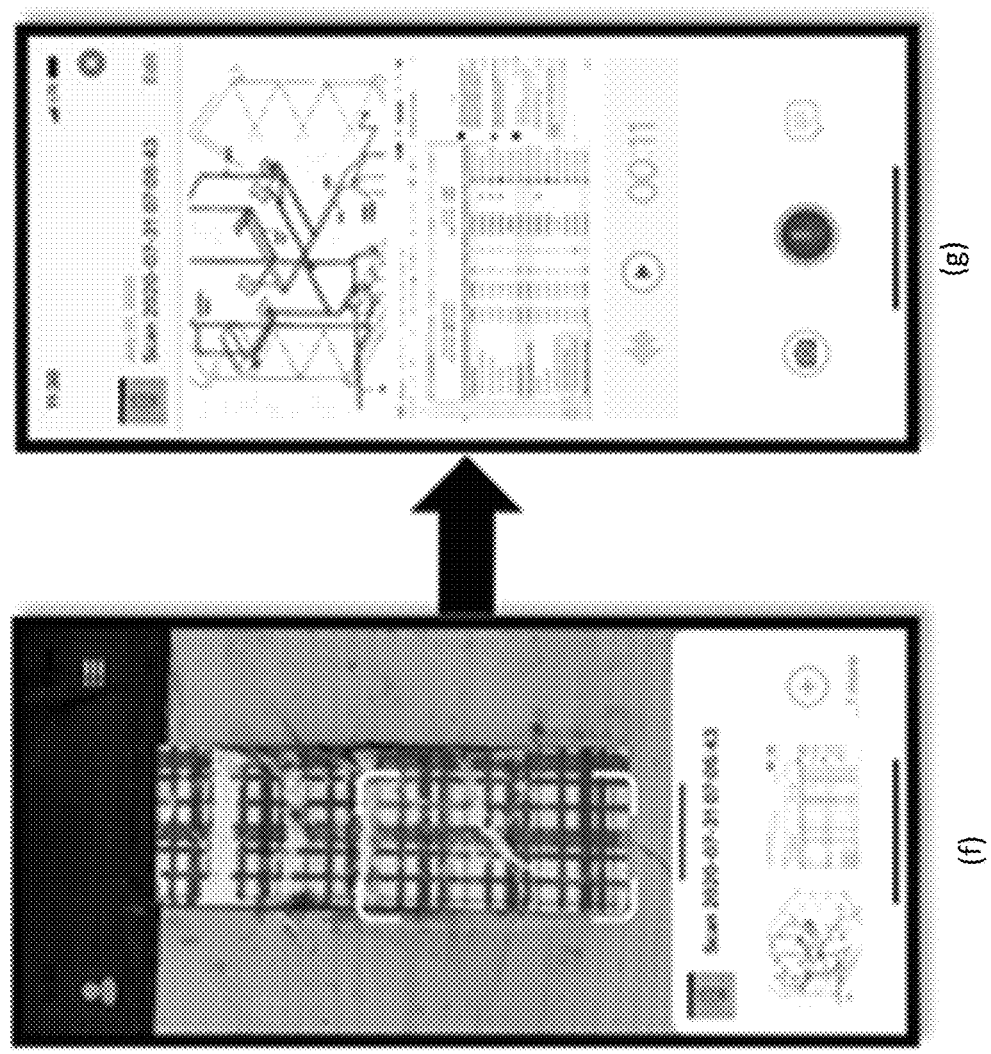
Figure 38D:
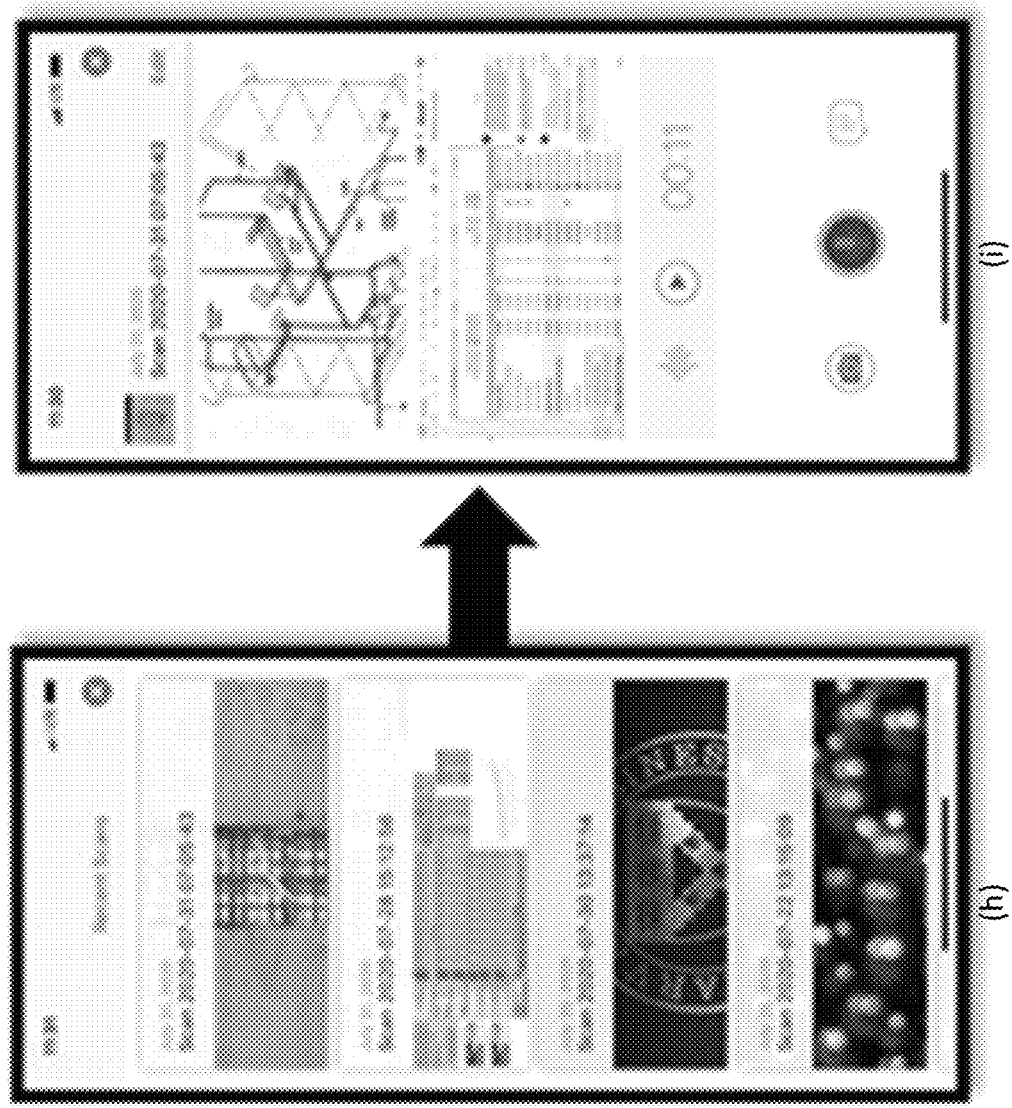

Another exemplary process flow for capturing one or more codes and associating information with the captured code(s) is now described with reference to the various graphical user interface screens shown in FIG. 38. FIG. 38(a) is an illustration showing a library of CMRCT pattern stored in the cloud or any form of database. This pattern has yet to be assigned to a specific digital address. A compatible software knows the order of this unique collection of patterns. FIG. 38(b) is a screen showing a CMRCT compatible app searching for and finding an arbitrary segment of CMRCT pattern. This segment of tape happens to be damaged significantly, yet the entire segment is still readable because the software successfully infers the damaged and unreadable codes in between those that are readable. In other words, it can fill in the gaps between undamaged codes since the order of unique codes is previously known and stored in the cloud or central database. This arbitrary pattern contains one or more unique codes in this case. By clicking on the '+' sign, the user aggregates all the unique code that are in view and bounded by the L shaped indicators. FIG. 38(c) is a screen showing the arbitrary segment of unique codes now assigned to a single digital address. The user has the option of adding any type of digital content. In this case, the user can add an image, a voice memo, or some text either in real time or pulled from the user's existing database. FIG. 38(d) is a screen showing the user adding a voice memo to the arbitrary piece of tape. Once complete, this voice memo and any other type of digital content falling under the digital address is now assigned to this arbitrary piece of CMRCT tape. FIG. 38(e) is a screen showing other types of digital content assigned to the arbitrary piece of tape and its respective digital address. FIG. 38(f) shows how another user with the same compatible software can scan this tape and immediately access the digital content stored for the arbitrary piece of tape. In this example, the second user's camera need only scan one of the multiple machine readable codes on the tape to gain access. The software recognizes the pattern, knows it is already assigned to a digital address, pulls up that digital address, and displays the relevant content. FIG. 38(g) is a screen showing the digital content assigned to that arbitrary piece of tape. In this example, this is the same content as seen in FIG. 38(e) (i.e., the content is shared between both users over a network). In this example, this user can edit/delete or add information to the stored digital content as necessary, although in some embodiments, some or all users may be provided with "read only" access (and different users could be given different access privileges). FIG. 38(h) is a screen showing a digital library of different pieces of tape. In addition to a user scanning a tape to gain access to the tape's digital content, the library feature can also enable remote access. FIG. 38(i) is a screen showing how a user can gain access to the same content via the digital library as the user could access by scanning the corresponding section of tape.

Thus, generally speaking, a CMRCT image processing software and system is configured to receive at least one scanned image of at least a portion of an arbitrary length segment of the tape of claim 1 (which could include, for example, a scan of the entire length of the segment or and arbitrary section of tape at a first location and at a second location), identify the distinct set of machine-readable codes on the arbitrary section of the tape based on the at least one scanned image (which could include, for example, inferring one or more codes), and associate the distinct set of machine-readable codes with a common set of digital addresses. At any time, but typically at least at the time the distinct set of machine-readable codes is associated with one or more digital addresses, information may be received and stored for one or more of the digital addresses. Also at any time, an input identifying any one or more of the distinct set of machine-readable codes associated with the arbitrary section of the tape (e.g., a photographic or videographic scan of at least a portion of the segment of tape) may be received, and in response, user access may be provided to at least one member of the common set of digital addresses via a user interface of a user device.

It should be noted that alternative embodiments can include adhesive tape similar to the types discussed above but where the tape comprises repeated, identical, machine-readable codes along a longitudinal portion of the tape up to and including the entire length of the tape. In this way, for example, the entire longitudinal portion of tape (and perhaps even multiple rolls of tape) can be associated with the same digital information based on the single unique code on the tape(s). As opposed to using tape to mark different objects with different codes as in various embodiments described above, tape with repeated, identical, machine-readable codes can be used to mark different objects with the same code and hence to associate different objects with the same set of digital addresses.

Without limitation, the following are some exemplary uses and applications for "digital tape" having repeated, identical, machine-readable codes:

Identification: A company such as Amazon assigns a unique code to each of its packaging associates (i.e., people who are responsible for packaging products for shipment) and provides rolls of tape with the unique codes to each of its packaging associates. Each packaging associate uses his or her rolls of tape to seal packages, thereby marking each package with the identity of the packaging associate. The company then can easily associate each package with the packaging associate who handled the package, e.g., if there was a packaging error or customer complaint.

Routing: A unique code is assigned to each of a number of locations or destinations (e.g., rooms in a house, floors in a building, departments in a company, shipping zones, etc.), and rolls of tape are produced with codes for these locations or destinations. In order to route an object to a particular location or destination, the object is marked or packaged using the appropriate roll of tape. Each object then can be scanned to identify the desired location or destination for the object.

In conclusion, the described embodiments provide unique solutions for tagging digital information to a specific, physical location in a form that is more easily accessible, durable, customizable-in-length, and capable of being read from a distance using a smartphone or other appropriately-configured device. This unique capability unlocks the potential to meet a whole new realm of customer needs.

8. Miscellaneous

It should be noted that headings are used above for convenience and are not to be construed as limiting the present invention in any way.

It should be noted that fastening materials used on a tape substrate generally include an adhesive for adhesive tape embodiments and hook-and-loop fasteners for fabric strip embodiments, although other types of fastening materials can be used in various alternative embodiments. For example, embodiments can be made with a metallic or magnetic material layer to allow for magnetically attaching a section of tape to an object, and other embodiments can allow for electrostatically attaching a section of tape to an object.

It should be noted that adhesives used in adhesive tape embodiments are not limited to any particular type of adhesive. For example, some tapes may use strong adhesives that make it difficult or impossible to remove the tape from an object without damaging the tape, while other tapes may use adhesives that allow for removal and/or reuse/replacement of a section of tape (e.g., a low-tack adhesive). Types of tapes and adhesives can be selected based on specific implementations, e.g., water activated tapes/adhesives, pressure sensitive tapes/adhesives, adhesives that do not leave residue on planned surfaces, tapes/adhesives that have a sufficient strength for a planned purpose such as sealing packages, etc.

It should be noted that different types of tapes, fastening materials, codes, and other elements may be described herein individually but can be used in any combination or combinations, e.g., any type of code can be used on any type of tape including any type of fastening material. Scanning of arbitrary length segments of tape can be done manually (e.g., with a hand-held scanner device such as a smartphone running an app of the types described herein or in communication with a system that processes images captured by the hand-held scanner device) or automatically (e.g., a packaging facility might have a scanner that automatically scans arbitrary length segments such as after a person or machine attaches a segment to a package and in some cases can automatically associate one or more digital address with the code or codes on the segment).

Various embodiments of the "app" and cloud-based system may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the "app" and cloud-based system) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. An adhesive tape comprising:
a non-repetitive varying pattern on at least one of its surfaces.

P2. Claim P1, with said pattern having been printed on a visible surface.

P3. Claim P1, with said pattern being machine-detectable from at least one side of the tape.

P4. Claim P1, wherein the non-repetitive varying pattern comprises a plurality of unique codes arranged successively along a longitudinal portion of the tape.

P5. Claim P4, wherein the unique codes encompass substantially equal lengths of the tape.

P6. Claim P4, wherein the unique codes are arranged with little or no space between adjacent codes.

P7. Claim P4, wherein the unique codes are arranged with a gap between adjacent codes P8. Claim P4, wherein the unique codes are arranged with a demarcation between adjacent codes for visually indicating the start and end of each unique code.

P9. Claim P1, with said tape being a pressure sensitive tape.

P10. Claim P9, with said tape being duct tape.

P11. Claim P2, with said pattern comprising parallel and orthogonal lines

P12. Claim P11, wherein the pattern comprising parallel and orthogonal lines cover substantially the entire length and width of the tape.

P13. Claim P3, using a camera with image processing software.

P14. Claim P2, with said pattern comprising of adjacent square 'cells' of length and width equal to the width of the tape.

P15. Claim P14, with said cells each containing a unique, machine-detectable code.

P16. An adhesive tape as in any of the above claims, wherein the tape is rolled.

P17. An image processing system that assigns multiple machine-detectable codes to the same digital address.

P18. Claim P17, where said codes are the unique codes on a tape.

P19. Claim P18, where said codes are physically adjacent to each other on a segment of tape.

P20. Claim P19, wherein the unique codes are arranged with little or no space between adjacent codes.

P21. Claim P19, wherein the unique codes are arranged with a gap between adjacent codes.

P22. Claim P19, wherein the unique codes are arranged with a demarcation between adjacent codes for visually indicating the start and end of each unique code.

P23. A system for digital data to interact with physical objects comprising:
the adhesive tape as in any of the claims P1-P16 above; and
the image processing software as in any of claims P17-P22 above.

P24. An adhesive tape comprising repeated, identical, machine-readable codes along a longitudinal portion of the tape.

What is claimed is:

1. An encoded tape comprising:
at least one fastener material on at least one surface of the tape; and
a non-repetitive varying pattern on at least one surface of the tape, the non-repetitive varying pattern encoding a plurality of different machine-readable codes, wherein the tape is separable into a plurality of arbitrary length segments including distinct sets of machine-readable codes that uniquely identify each such segment from other such segments of the tape, and wherein each arbitrary length segment of tape is attachable to an object using the at least one fastener material on the at least one surface of the arbitrary length segment of tape.

2. A tape according to claim 1, wherein said pattern is printed on a visible surface of the tape.

3. A tape according to claim 1, wherein said pattern is machine-detectable from at least one side of the tape.

4. A tape according to claim 1, wherein the non-repetitive varying pattern comprises a plurality of unique codes arranged successively along a longitudinal portion of the tape in both length and width.

5. A tape according to claim 1, wherein the unique codes encompass substantially equal lengths of the tape.

6. A tape according to claim 1, wherein the unique codes are arranged with little to no space between adjacent codes.

7. A tape according to claim 1, wherein the unique codes are arranged with a gap between adjacent codes.

8. A tape according to claim 1, wherein the pattern comprises demarcations identifying locations of the machine-readable codes on the tape.

9. A tape according to claim 1, wherein the at least one fastener material comprises a pressure sensitive material.

10. A tape according to claim 1, wherein the at least one fastener material comprises an adhesive that does not leave residue on at least one selected surface to be taped.

11. A tape according to claim 1, wherein the at least one fastener material comprises a water activated adhesive.

12. A tape according to claim 1, wherein the at least one fastener material comprises hook fasteners and loop fasteners.

13. A tape according to claim 1, wherein the pattern on the tape is not visually discernible by a human as including the presence of machine-readable codes.

14. A tape according to claim 1, wherein the pattern on the tape is outside of the visual spectrum such that the presence of machine-readable codes on the tape is not visually discernible by a human.

15. A tape according to claim 1, wherein the pattern comprises parallel and orthogonal lines.

16. A tape according to claim 15, wherein the parallel and orthogonal lines cover substantially the entire length and width of the tape.

17. A tape according to claim 1, wherein said pattern comprises adjacent cells of length and width equal to the width of the tape, each cell including at least one machine-readable code.

18. A tape according to claim 1, wherein the tape is rolled.

19. An image processing system comprising:
an image scanner configured to provide at least one scanned image of at least a portion of an arbitrary length segment of the tape of claim 1; and
an image processor configured to receive the at least one scanned image, identify the distinct set of machine-readable codes on the arbitrary length segment of the tape based on the at least one scanned image, associate the distinct set of machine-readable codes with a common set of digital addresses, subsequently receive an input identifying any one or more of the distinct set of machine-readable codes associated with the arbitrary length segment of the tape, and, in response to receiving the input, providing user access to at least one member of the common set of digital addresses via a user interface of a user device.

20. A system according to claim 19, wherein the image processor is further configured to receive and store information for a given one of the common set of digital address prior to receiving the input, such that access to the stored information is provided in response to the input.

21. A system according to claim 19, wherein the input comprises a photographic or videographic scan of at least a portion of the arbitrary section of tape.

22. A system according to claim 19, wherein the at least one scanned image comprises images scanned at a first location and at a second location of the arbitrary section of the tape, wherein the image processor is further configured to identify a first machine-readable code at the first location, identify a second machine-readable code at the second location, and infer at least one additional machine-readable code between the first and second machine-readable codes.

23. A method comprising:
receiving at least one scanned image of at least a portion of an arbitrary length segment of the tape of claim 1;
identifying the distinct set of machine-readable codes on the arbitrary length segment of the tape based on the at least one scanned image;
associating the distinct set of machine-readable codes with a common set of digital addresses;
subsequently receiving an input identifying any one or more of the distinct set of machine-readable codes associated with the arbitrary length segment of the tape; and
in response to receiving the input, providing user access to at least one member of the common set of digital addresses via a user interface of a user device.

24. A method according to claim 23, further comprising:
prior to receiving the input, receiving and storing information for a given one of the common set of digital addresses, such that access to the stored information is provided in response to the input.

25. A method according to claim 23, wherein the input comprises a photographic or videographic scan of at least a portion of the arbitrary section of tape.

26. A method according to claim 23, wherein:
scanning at least a portion of the arbitrary section of the tape comprises scanning the arbitrary section of tape at a first location and at a second location; and
identifying the distinct set of machine-readable codes on the arbitrary section of the tape comprises identifying a first machine-readable code at the first location, identifying a second machine-readable code at the second location, and inferring at least one additional machine-readable code between the first and second machine-readable codes.

27. An encoded tape comprising:
at least one fastener material on at least one surface of the tape; and
repeated, identical, machine-readable codes along a longitudinal portion of at least one surface of the tape, wherein the tape is separable into a plurality of arbitrary length segments, each arbitrary length segment including at least one of the repeated, identical, machine-readable codes, such that each arbitrary length segment of tape is attachable to a different object of a plurality of objects using the at least one fastener material on the at least one surface of the arbitrary length segment of tape to associate such objects with a common set of digital addresses associated with the machine-readable codes.

28. A tape according to claim 27, wherein the at least one fastener material comprises an adhesive.

29. A tape according to claim 27, wherein the at least one fastener material comprises hook fasteners and loop fasteners.

30. A tape according to claim 27, wherein the tape is rolled.

* * * * *